US011323880B2

(12) United States Patent
Cho et al.

(10) Patent No.: US 11,323,880 B2
(45) Date of Patent: May 3, 2022

(54) METHOD FOR WIRELESS CONNECTION AND ELECTRONIC DEVICE THEREFOR

(71) Applicant: Samsung Electronics Co., Ltd., Gyeonggi-do (KR)

(72) Inventors: Nam-Ju Cho, Gyeonggi-do (KR); Hye-Jung Bang, Seoul (KR); Dong-Jea Jung, Gyeonggi-do (KR); Bum-Jib Kim, Gyeonggi-do (KR); Hyunah Oh, Gyeonggi-do (KR); Bokun Choi, Seoul (KR); Bu-Seop Jung, Gyeonggi-do (KR); Doo-Suk Kang, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/608,597

(22) PCT Filed: Apr. 6, 2018

(86) PCT No.: PCT/KR2018/004078
§ 371 (c)(1),
(2) Date: Oct. 25, 2019

(87) PCT Pub. No.: WO2018/199501
PCT Pub. Date: Nov. 1, 2018

(65) Prior Publication Data
US 2020/0146081 A1 May 7, 2020

(30) Foreign Application Priority Data

Apr. 28, 2017 (KR) .................. 10-2017-0055562

(51) Int. Cl.
*H04W 76/14* (2018.01)
*H04W 12/069* (2021.01)
(Continued)

(52) U.S. Cl.
CPC ......... *H04W 12/069* (2021.01); *H04W 48/16* (2013.01); *H04W 76/11* (2018.02); *H04W 76/14* (2018.02); *H04L 61/6022* (2013.01)

(58) Field of Classification Search
CPC combination set(s) only.
See application file for complete search history.

(56) References Cited

U.S. PATENT DOCUMENTS

2005/0138229 A1* 6/2005 Sartore ................. G06F 13/385
710/15
2007/0204069 A1 8/2007 Bhesania et al.
(Continued)

FOREIGN PATENT DOCUMENTS

JP 2013-502159 1/2013
KR 1020070075874 7/2007
(Continued)

OTHER PUBLICATIONS

PCT/ISA/210 Search Report issued on PCT/KR2018/004078, pp. 5.
(Continued)

*Primary Examiner* — Mandish K Randhawa
(74) *Attorney, Agent, or Firm* — The Farrell Law Firm, P.C.

(57) ABSTRACT

The electronic device according to various embodiments may comprise: a housing; a universal serial bus (USB) connector connected or integrated with the housing; a wireless communication circuit located inside the housing; a processor that is located inside the housing and electrically connected to the USB connector and the wireless communication circuit; and a memory that is located inside the housing and electrically connected to the processor. The memory, when in operation, may store instructions for the processor to determine that the USB connector is electrically connected to a first external electronic device having an identifier, receive the identifier from the first external elec- (Continued)

tronic device via the USB connector, generate a wireless signal packet comprising the identifier, receive a probe request from a second external electronic device via the wireless communication circuit, transmit the wireless signal packet to the second external electronic device via the wireless communication circuit, and configure a wireless communication channel with the second external electronic device, after transmitting the wireless signal packet. Other various embodiments are possible.

9 Claims, 36 Drawing Sheets

(51) Int. Cl.
*H04W 76/11* (2018.01)
*H04W 48/16* (2009.01)
*H04L 101/622* (2022.01)

(56) References Cited

U.S. PATENT DOCUMENTS

| 2012/0156993 | A1* | 6/2012 | Seo | G06F 13/4045 |
| | | | | 455/41.1 |
| 2014/0065962 | A1 | 3/2014 | Le et al. | |
| 2014/0306865 | A1 | 10/2014 | Pan et al. | |
| 2014/0334387 | A1* | 11/2014 | Doppler | H04W 74/0816 |
| | | | | 370/329 |
| 2016/0048367 | A1 | 2/2016 | Chen | |
| 2018/0343547 | A1* | 11/2018 | Chaki | H04L 67/1068 |

FOREIGN PATENT DOCUMENTS

| KR | 100876477 | 12/2008 |
| WO | WO 2006135872 | 12/2006 |
| WO | WO 2014185955 | 11/2014 |

OTHER PUBLICATIONS

PCT/ISA/237 Written Opinion issued on PCT/KR2018/004078, pp. 5.
Korean Office Action dated Apr. 1, 2021 issued in counterpart application No. 10-2017-0055562, 20 pages.
KR Notice of Patent Grant dated Oct. 12, 2021 issued in counterpart application No. 10-2017-0055562, 5 pages.

* cited by examiner

METHOD FOR WIRELESS CONNECTION AND ELECTRONIC DEVICE THEREFOR

PRIORITY

This application is a National Phase Entry of PCT International Application No. PCT/KR2018/004078, which was filed on Apr. 6, 2018, and claims priority to Korean Patent Application No. 10-2017-0055562, which was filed on Apr. 28, 2017, the content of each of which is incorporated herein by reference.

TECHNICAL FIELD

Various embodiments relate to a method for wireless connection and an electronic device thereof.

BACKGROUND ART

As traffic consumption by portable electronic devices such as smart phones increases, wireless local area network (WLAN) services, which are advantageous in terms of cost, are widely used. In general, a WLAN is formed around a control node called an access point (AP). However, a wireless peer-to-peer (P2P) communication scheme that forms a network using a direct link between stations without an AP has been actively studied in recent years.

In order for a host device and a client device to exchange data with each other through wireless P2P communication, both the host device and the client device should support the wireless P2P communication. If a host device (e.g., a desktop PC or a smart TV) that does not support a wireless interface for wireless P2P communication wishes to perform wireless P2P communication with a client device that supports wireless P2P communication, the host device can perform wireless P2P communication with the client device using a dongle device that is connectable through a wired interface (e.g., a universal serial bus (USB)). The client device can perform wireless P2P communication with the host device through a dongle device inserted and operated in the wired interface of the host device.

DISCLOSURE OF INVENTION

Technical Problem

When the host device performs wireless P2P communication through the dongle device, the client device may recognize the other party as the dongle device. Thus, even if the dongle device is mounted on another host device, the client device may not be aware of a change of the host device. As a result, the changed host device may obtain information of the client device without authenticating the client device.

Various embodiments may provide a method for enhancing security of wireless P2P communication and an electronic device thereof.

Solution to Problem

According to various embodiments, an electronic device includes: a housing; a USB connector configured to be connected to or integrated with the housing; a wireless communication circuit configured to be located in the housing; a processor configured to be located in the housing and electrically coupled to the USB connector and the wireless communication circuit; and a memory configured to be located in the housing and electrically coupled to the processor. The memory may store, when executed, instructions that cause the processor to determine whether the USB connector is electrically connected to a first external electronic device having an identifier, to receive the identifier from the first external electronic device through the USB connector, to generate a wireless signal packet including the identifier, to receive a probe request from a second external electronic device through the wireless communication circuit, to transmit the wireless signal packet to the second external electronic device through the wireless\ communication circuit, and to establish a wireless communication channel with the second external electronic device after transmitting the wireless signal packet.

According to various embodiments, a method for operating an electronic device includes: determining that a USB connector included in the electronic device is electrically connected to a first external electronic device having an identifier; receiving the identifier from the first external electronic device through the USB connector; receiving a probe request from a second external electronic device through a wireless communication circuit included in the electronic device; transmitting a wireless signal packet to the second external electronic device through the wireless communication circuit; and establishing a wireless communication channel with the second external electronic device.

According to various embodiments, a system includes: an electronic device configured to receive, from a first external electronic device having an identifier, the identifier through a USB connector; and a second external electronic device configured to transmit a probe request to the electronic device. The electronic device may transmit a wireless signal packet including the identifier to the second external electronic device. The second external electronic device may establish a wireless communication channel with the electronic device.

Advantageous Effects of Invention

A method according to various embodiments and an electronic device thereof may enhance security by performing wireless peer-to-peer (P2P) communication with a client device included in a persistent group determined based on information for identifying a host device.

BEST MODE FOR CARRYING OUT THE INVENTION

Figure 1A:
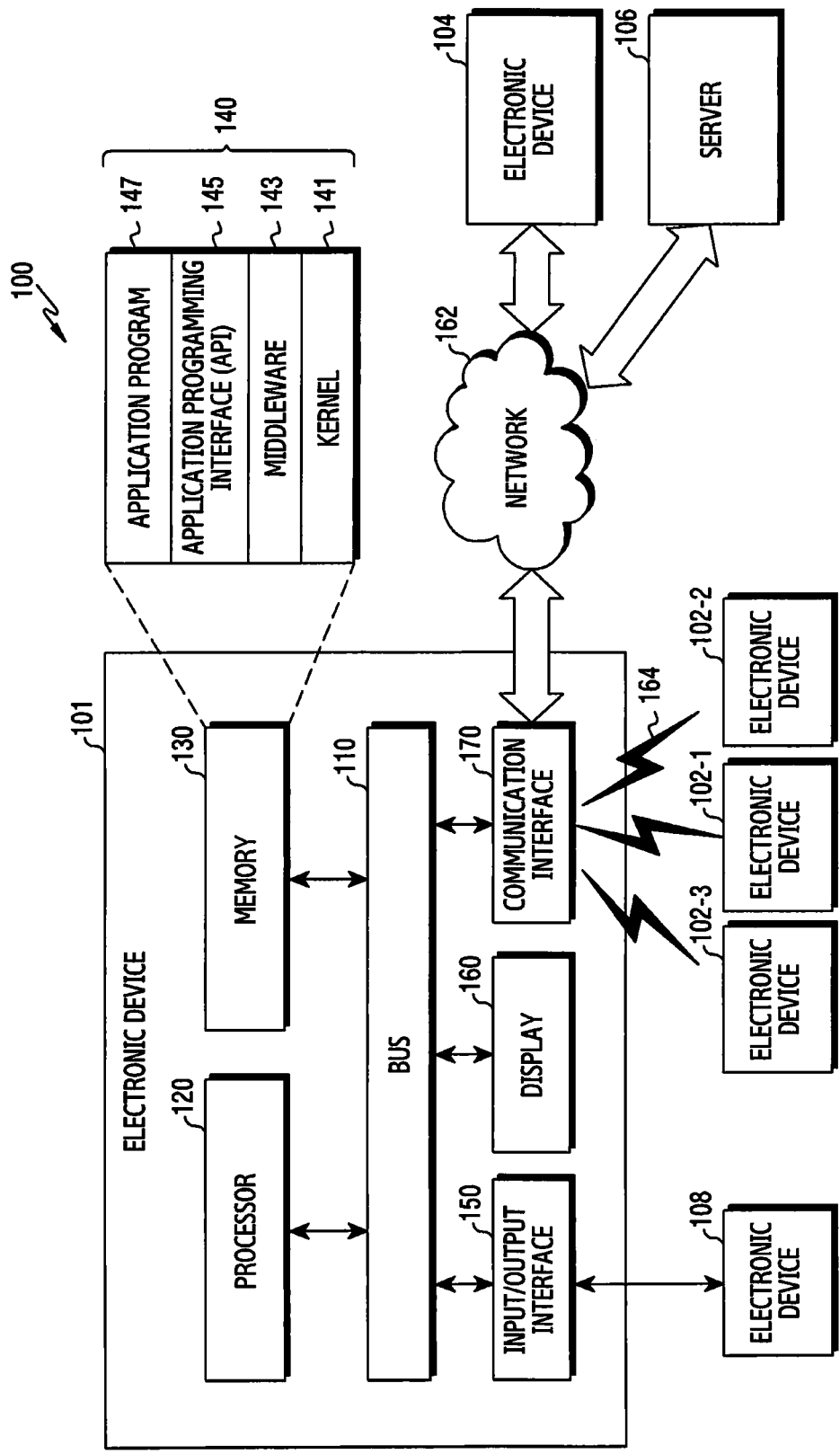
FIG. 1A illustrates an example of an electronic device in a network environment according to various embodiments.

Hereinafter, various embodiments of the present disclosure are disclosed with reference to the accompanying drawings. However, the present disclosure is not intended to be limited by the various embodiments of the present disclosure to a specific embodiment and it is intended that the present disclosure covers all modifications, equivalents, and/or alternatives of the present disclosure provided they come within the scope of the appended claims and their equivalents. With respect to the descriptions of the accompanying drawings, like reference numerals refer to like elements. The terms of a singular form may include plural forms unless they have a clearly different meaning in the context. For example, the expressions "A or B," or "at least one of A and/or B" may indicate A and B, A, or B. The terms such as "1st," "2nd," "first," "second," and the like used herein may refer to modifying various different elements of various embodiments of the present disclosure, but are not intended to limit the elements. In various embodiments of the present disclosure, it is intended that when a component (for example, a first component) is referred to as being "operatively or communicatively coupled with/to" or "connected to" another component (for example, a second component), the component may be directly connected to the other component or connected through another component (for example, a third component).

The expression "configured to" used in various embodiments of the present disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (for example, an embedded processor) for performing a corresponding operation or a general purpose processor (for example, a central processing unit (CPU) or application processor (AP)) for performing corresponding operations by executing at least one software program stored in a memory device.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HDM)), a textile- or clothing-integrated-type device (e.g., an electronic apparel), a body-attached-type device (e.g., a skin pad or a tattoo), or a bio-implantable-type device (e.g., an implantable circuit). In some various embodiments of the present disclosure, an electronic device may be a home appliance. The smart home appliance may include at least one of, for example, a television (TV), a digital versatile disc (DVD) player, an audio, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, or an electronic picture frame.

In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like). According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). An electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of new technology. The term "user" used herein may refer to a person who uses an electronic device or may refer to a device (e.g., an artificial intelligence electronic device) that uses an electronic device.

FIG. 1A illustrates an example of an electronic device in a network environment according to various embodiments.

An electronic device 101 in a network environment 100 according to various embodiments of the present disclosure will be described with reference to FIG. 1A. The electronic device 101 may include a bus 110, a processor 120, a memory 130, an input/output interface 150, a display 160, and a communication interface 170. In various embodiments of the present disclosure, at least one of the foregoing elements may be omitted or another element may be added to the electronic device 101. The bus 110 may include a circuit for connecting the above-mentioned elements 110 to 170 to each other and transferring communications (e.g., control messages and/or data) among the above-mentioned elements. The processor 120 may include at least one of a central processing unit (CPU), an application processor (AP), or a communication processor (CP). The processor 120 may perform data processing or an operation related to communication and/or control of at least one of the other elements of the electronic device 101.

The memory 130 may include a volatile memory and/or a nonvolatile memory. The memory 130 may store instructions or data related to at least one of the other elements of the electronic device 101. According to an embodiment of the present disclosure, the memory 130 may store software and/or a program 140. The program 140 may include, for example, a kernel 141, a middleware 143, an application programming interface (API) 145, and/or an application program (or an application) 147. At least a portion of the kernel 141, the middleware 143, or the API 145 may be referred to as an operating system (OS). The kernel 141 may control or manage system resources (e.g., the bus 110, the processor 120, the memory 130, or the like) used to perform operations or functions of other programs (e.g., the middleware 143, the API 145, or the application program 147). Furthermore, the kernel 141 may provide an interface for allowing the middleware 143, the API 145, or the application program 147 to access individual elements of the electronic device 101 in order to control or manage the system resources.

The middleware 143 may serve as an intermediary so that the API 145 or the application program 147 communicates and exchanges data with the kernel 141. Furthermore, the middleware 143 may handle one or more task requests received from the application program 147 according to a priority order. For example, the middleware 143 may assign at least one application program 147 a priority for using the system resources (e.g., the bus 110, the processor 120, the memory 130, or the like) of the electronic device 101. For example, the middleware 143 may handle the one or more task requests according to the priority assigned to the at least one application, thereby performing scheduling or load balancing with respect to the one or more task requests. The API 145, which is an interface for allowing the application 147 to control a function provided by the kernel 141 or the middleware 143, may include, for example, at least one interface or function (e.g., instructions) for file control, window control, image processing, character control, or the like. The input/output interface 150 may serve to transfer an instruction or data input from a user or another external device to (an)other element(s) of the electronic device 101. Furthermore, the input/output interface 150 may output instructions or data received from (an)other element(s) of the electronic device 101 to the user or another external device.

The display 160 may include, for example, a liquid crystal display (LCD), a light-emitting diode (LED) display, an organic light-emitting diode (OLED) display, a microelectromechanical systems (MEMS) display, or an electronic paper display. The display 160 may present various content (e.g., a text, an image, a video, an icon, a symbol, or the like) to the user. The display 160 may include a touch screen, and may receive a touch, gesture, proximity or hovering input from an electronic pen or a part of a body of the user. The communication interface 170 may set communications between the electronic device 101 and an external device (e.g., a first external electronic device 102-1, 102-2, or 102-3, a second external electronic device 104, or a server 106). For example, the communication interface 170 may be connected to a network 162 via wireless communications or wired communications so as to communicate with the external device (e.g., the second external electronic device 104 or the server 106).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communication 164. The short-range communications may include at least one of wireless fidelity (Wi-Fi), Bluetooth, near field communication (NFC), magnetic stripe transmission (MST), or GNSS. The MST may generate pulses according to transmission data and the pulses may generate electromagnetic signals. The electronic device 101 may transmit the electromagnetic signals to a reader device such as a POS (point of sales) device. The POS device may detect the magnetic signals by using a MST reader and restore data by converting the detected electromagnetic signals into electrical signals. The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 232 (RS-232), plain old telephone service (POTS), or the like. The network 162 may include at least one of telecommunications networks, for example, a computer network (e.g., local area network (LAN) or wide area network (WAN)), the Internet, or a telephone network.

The types of the first external electronic device 102-1, 102-2, or 102-3, and the second external electronic device 104 may be the same as or different from the type of the electronic device 101. According to an embodiment of the present disclosure, the server 106 may include a group of one or more servers. A portion or all of operations performed in the electronic device 101 may be performed in one or more other electronic devices (e.g., the first electronic device 102-1, 102-2, or 102-3, the second external electronic device 104, or the server 106). When the electronic device 101 should perform a certain function or service automatically or in response to a request, the electronic device 101 may request at least a portion of functions related to the function or service from another device (e.g., the first electronic device 102-1, 102-2, or 102-3, the second external electronic device 104, or the server 106) instead of or in addition to performing the function or service for itself. The other electronic device (e.g., the first electronic device 102-1, 102-2, or 102-3, the second external electronic device 104, or the server 106) may perform the requested function or additional function, and may transfer a result of the performance to the electronic device 101. The electronic device 101 may use a received result itself or additionally process the received result to provide the requested function or service. To this end, for example, a cloud computing technology, a distributed computing technology, or a client-server computing technology may be used.

Figure 1B:
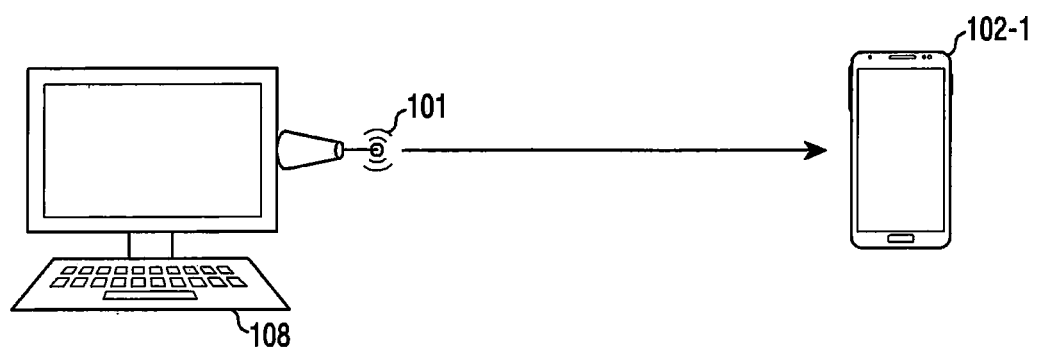
FIG. 1B illustrates an example of another network environment including an electronic device according to various embodiments.

FIG. 1B illustrates an example of another network environment including an electronic device according to various embodiments.

Referring to FIG. 1B, according to one embodiment, an electronic device 101 may be implemented as a dongle-type device. The dongle device is an electronic device that can be connected to an input/output interface (e.g., a USB port) of a host device (e.g., an electronic device 108) and may be a device for assisting a communication function of the host device. For example, the dongle device may be an electronic device that is connected to a host device to allow a host device that does not support wireless P2P communication to perform wireless P2P communication with a client device (e.g., an electronic device 102-1) that supports wireless P2P communication. The dongle device may be referred to as a "connecting device", an "auxiliary communication device" or another name having an equivalent technical meaning.

The electronic device 108 may perform P2P wireless communication with the electronic device 102-1 using the electronic device 101. That is, when the electronic device 108 that does not support wireless P2P communication wishes to perform wireless P2P communication with the electronic device 102-1 that supports wireless P2P communication, the electronic device 108 may perform wireless P2P communication with the electronic device 102-1 using the electronic device 101 that supports wireless P2P communication.

In the example of FIG. 1B, the electronic device 101 is described as being mounted to the electronic device 108 through a wired interface, but various embodiments are not limited thereto. According to various embodiments, the electronic device 101 may be connected to the electronic device 108 through a wireless link.

According to various embodiments, the electronic device 101 may be implemented differently from the form shown in FIG. 1B. For example, the electronic device 101 may be implemented in the form of a smart phone.

Figure 2:
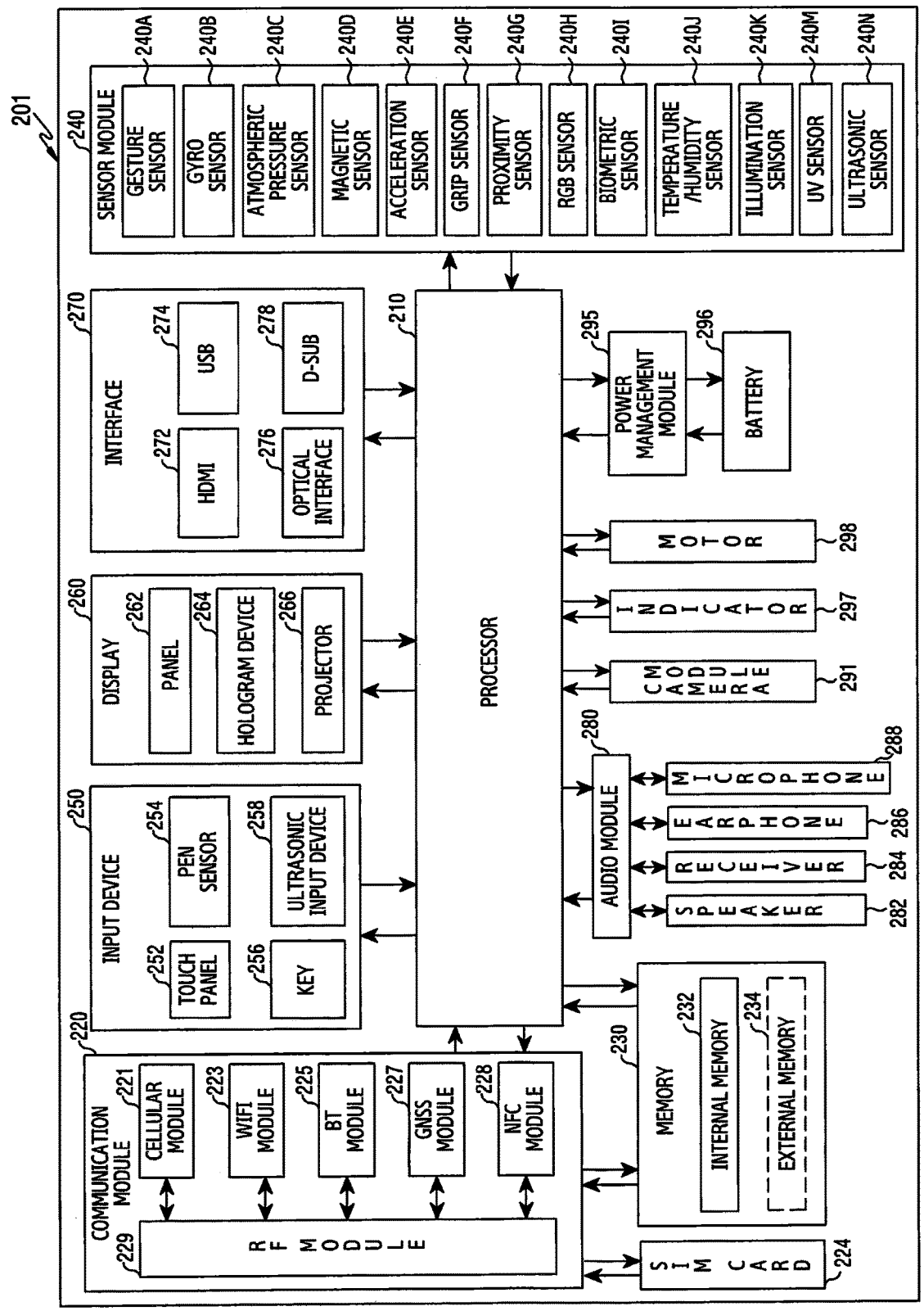
FIG. 2 illustrates an example of a block diagram of an electronic device according to various embodiments.

FIG. 2 illustrates an example of a block diagram of an electronic device according to various embodiments.

Referring to FIG. 2, an electronic device 201 may include, for example, a part or the entirety of the electronic device 101 illustrated in FIG. 1A. The electronic device 201 may include at least one processor (e.g., AP) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 may run an operating system or an application program so as to control a plurality of hardware or software elements connected to the processor 210, and may process various data and perform operations. The processor 210 may be implemented with, for example, a system on chip (SoC). According to an embodiment of the present disclosure, the processor 210 may further include a graphic processing unit (GPU) and/or an image signal processor. The processor 210 may include at least a portion (e.g., a cellular module 221) of the elements illustrated in FIG. 2. The processor 210 may load, on a volatile memory, an instruction or data received from at least one of other elements (e.g., a nonvolatile memory) to process the instruction or data, and may store various data in a nonvolatile memory.

The communication module 220 may have a configuration that is the same as or similar to that of the communication interface 170 of FIG. 1A. The communication module 220 may include, for example, a cellular module 221, a Wi-Fi module 223, a Bluetooth (BT) module 225, a GNSS module 227 (e.g., a GPS module, a GLONASS module, a BeiDou module, or a Galileo module), a NFC module 228, and a radio frequency (RF) module 229. The cellular module 221 may provide, for example, a voice call service, a video call service, a text message service, or an Internet service through a communication network. The cellular module 221 may identify and authenticate the electronic device 201 in the communication network using the subscriber identification module 224 (e.g., a SIM card). The cellular module 221 may perform at least a part of functions that may be provided by the processor 210. The cellular module 221 may include a communication processor (CP). Each of the Wi-Fi module 223, the Bluetooth module 225, the GNSS module 227 and the NFC module 228 may include, for example, a processor for processing data transmitted/received through the modules. According to some various embodiments of the present disclosure, at least a part (e.g., two or more) of the cellular module 221, the Wi-Fi module 223, the Bluetooth module 225, the GNSS module 227, and the NFC module 228 may be included in a single integrated chip (IC) or IC package. The RF module 229 may transmit/receive, for example, communication signals (e.g., RF signals). The RF module 229 may include, for example, a transceiver, a power amp module (PAM), a frequency filter, a low noise amplifier (LNA), an antenna, or the like. According to another embodiment of the present disclosure, at least one of the cellular module 221, the Wi-Fi module 223, the Bluetooth module 225, the GNSS module 227, or the NFC module 228 may transmit/receive RF signals through a separate RF module. The SIM 224 may include, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 230 (e.g., the memory 130) may include, for example, an internal memory 232 or an external memory 234. The internal memory 232 may include at least one of a volatile memory (e.g., a dynamic RAM (DRAM), a static RAM (SRAM), a synchronous dynamic RAM (SDRAM), or the like), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD). The external memory 234 may include a flash drive such as a compact flash (CF), a secure digital (SD), a Micro-SD, a Mini-SD, an extreme digital (xD), a MultiMediaCard (MMC), a memory stick, or the like. The external memory 234 may be operatively and/or physically connected to the electronic device 201 through various interfaces.

The sensor module 240 may, for example, measure physical quantity or detect an operation state of the electronic device 201 so as to convert measured or detected information into an electrical signal. The sensor module 240 may include, for example, at least one of a gesture sensor 240A, a gyro sensor 240B, a barometric pressure sensor 240C, a magnetic sensor 240D, an acceleration sensor 240E, a grip sensor 240F, a proximity sensor 240G, a color sensor 240H (e.g., a red/green/blue (RGB) sensor), a biometric sensor 240I, a temperature/humidity sensor 240J, an illumination sensor 240K, or an ultraviolet (UV) sensor 240M. Additionally or alternatively, the sensor module 240 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 240 may further include a control circuit for controlling at least one sensor included therein. In some various embodiments of the present disclosure, the electronic device 201 may further include a processor configured to control the sensor module 240 as a part of the processor 210 or separately, so that the sensor module 240 is controlled while the processor 210 is in a sleep state.

The input device 250 may include, for example, a touch panel 252, a (digital) pen sensor 254, a key 256, or an ultrasonic input device 258. The touch panel 252 may employ at least one of capacitive, resistive, infrared, and ultraviolet sensing methods. The touch panel 252 may further include a control circuit. The touch panel 252 may further include a tactile layer so as to provide a haptic feedback to a user. The (digital) pen sensor 254 may include, for example, a sheet for recognition which is a part of a touch panel or is separate. The key 256 may include, for example, a physical button, an optical button, or a keypad. The ultrasonic input device 258 may sense ultrasonic waves generated by an input tool through a microphone 288 so as to identify data corresponding to the ultrasonic waves sensed.

The display 260 (e.g., the display 160) may include a panel 262, a hologram device 264, or a projector 266. The panel 262 may have a configuration that is the same as or similar to that of the display 160 of FIG. 1A. The panel 262 may be, for example, flexible, transparent, or wearable. The panel 262 and the touch panel 252 may be integrated into a single module. The hologram device 264 may display a stereoscopic image in a space using a light interference phenomenon. The projector 266 may project light onto a screen so as to display an image. The screen may be disposed in the inside or the outside of the electronic device 201. According to an embodiment of the present disclosure, the display 260 may further include a control circuit for controlling the panel 262, the hologram device 264, or the projector 266. The interface 270 may include, for example, an HDMI 272, a USB 274, an optical interface 276, or a D-subminiature (D-sub) 278. The interface 270, for example, may be included in the communication interface 170 illustrated in FIG. 1A. Additionally or alternatively, the interface 270 may include, for example, a mobile high-definition link (MHL) interface, an SD card/multi-media card (MMC) interface, or an infrared data association (IrDA) interface.

The audio module 280 may convert, for example, a sound into an electrical signal or vice versa. At least a portion of elements of the audio module 280 may be included in the input/output interface 150 illustrated in FIG. 1A. The audio module 280 may process sound information input or output through a speaker 282, a receiver 284, an earphone 286, or the microphone 288. The camera module 291 is, for example, a device for shooting a still image or a video. According to an embodiment of the present disclosure, the camera module 291 may include at least one image sensor (e.g., a front sensor or a rear sensor), a lens, an image signal processor (ISP), or a flash (e.g., an LED or a xenon lamp). The power management module 295 may manage power of the electronic device 201. According to an embodiment of the present disclosure, the power management module 295 may include a power management integrated circuit (PMIC), a charger integrated circuit (IC), or a battery or gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 296 and a voltage, current or temperature thereof while the battery is charged. The battery 296 may include, for example, a rechargeable battery and/or a solar battery.

The indicator 297 may display a specific state of the electronic device 201 or a part thereof (e.g., the processor 210), such as a booting state, a message state, a charging state, or the like. The motor 298 may convert an electrical signal into a mechanical vibration, and may generate a vibration or haptic effect. Although not illustrated, a processing device (e.g., a GPU) for supporting a mobile TV may be included in the electronic device 201. The processing device for supporting a mobile TV may process media data according to the standards of digital multimedia broadcasting (DMB), digital video broadcasting (DVB), MediaFLO™, or the like. Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

Figure 3:
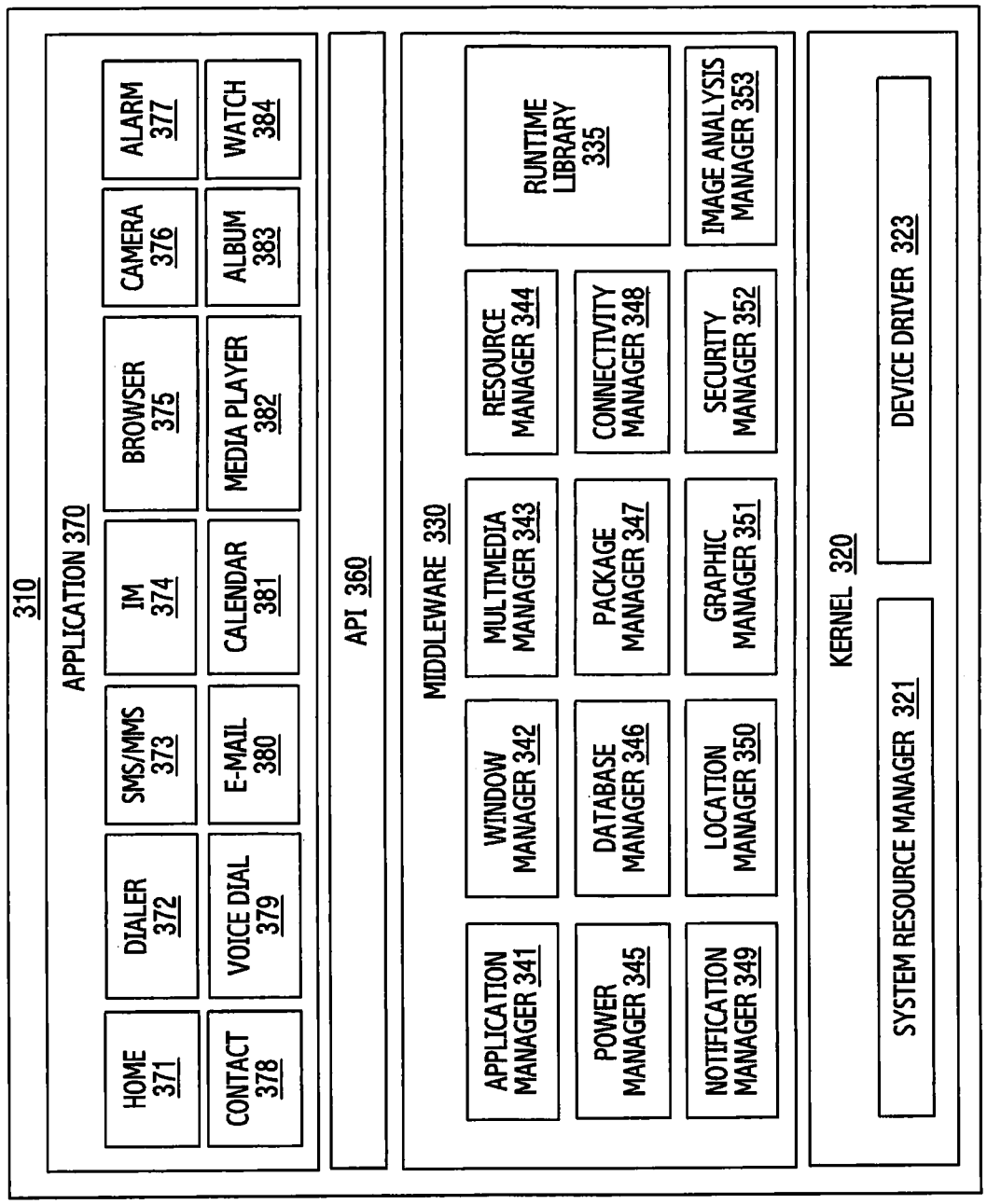
FIG. 3 illustrates an example of a block diagram of a program module according to various embodiments.

FIG. 3 illustrates an example of a block diagram of a program module according to various embodiments. According to an embodiment of the present disclosure, a program module 310 (e.g., the program 140) may include an operating system (OS) for controlling a resource related to an electronic device (e.g., the electronic device 101) and/or various applications (e.g., the application program 147) running on the OS. The operating system may be, for example, Android, iOS, Windows, Symbian, Tizen, or the like.

Referring to FIG. 3, the program module 310 may include a kernel 320, a middleware 330, an API 360, and/or an application 370. At least a part of the program module 310 may be preloaded on an electronic device or may be downloaded from an external electronic device (e.g., the first electronic device 102, the second external electronic device 104, or the server 106).

The kernel 320 (e.g., the kernel 141) may include, for example, a system resource manager 321 or a device driver 323. The system resource manager 321 may perform control, allocation, or retrieval of a system resource. According to an embodiment of the present disclosure, the system resource manager 321 may include a process management unit, a memory management unit, a file system management unit, or the like. The device driver 323 may include, for example, a display driver, a camera driver, a Bluetooth driver, a shared memory driver, a USB driver, a keypad driver, a Wi-Fi driver, an audio driver, or an inter-process communication (IPC) driver. The middleware 330, for example, may provide a function that the applications 370 require in common, or may provide various functions to the applications 370 through the API 360 so that the applications 370 may efficiently use limited system resources in the electronic device. According to an embodiment of the present disclosure, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a complier uses to add a new function through a programming language while the application 370 is running. The runtime library 335 may perform a function for input/output management, memory management, or an arithmetic function. The application manager 341 may mange, for example, a life cycle of at least one of the applications 370. The window manager 342 may manage a GUI resource used in a screen. The multimedia manager 343 may recognize a format required for playing various media files and may encode or decode a media file using a codec matched to the format. The resource manager 344 may manage a resource such as a source code, a memory, or a storage space of at least one of the applications 370. The power manager 345, for example, may operate together with a basic input/output system (BIOS) to manage a battery or power and may provide power information required for operating the electronic device. The database manager 346 may generate, search, or modify a database to be used in at least one of the applications 370. The package manager 347 may manage installation or update of an application distributed in a package file format.

The connectivity manger 348 may manage wireless connection of Wi-Fi, Bluetooth, or the like. The notification manager 349 may display or notify an event such as message arrival, appointments, and proximity alerts in such a manner as not to disturb a user. The location manager 350 may manage location information of the electronic device. The graphic manager 351 may manage a graphic effect to be provided to a user or a user interface related thereto. The security manager 352 may provide various security functions required for system security or user authentication. According to an embodiment of the present disclosure, in the case in which an electronic device (e.g., the electronic device 101) includes a phone function, the middleware 330 may further include a telephony manager for managing a voice or video call function of the electronic device. The middleware 330 may include a middleware module for forming a combination of various functions of the above-mentioned elements. The middleware 330 may provide a module specialized for each type of an operating system to provide differentiated functions. Furthermore, the middleware 330 may delete a part of existing elements or may add new elements dynamically. The API 360 (e.g., the API 145) which is, for example, a set of API programming functions may be provided in different configurations according to an operating system. For example, in the case of Android or iOS, one API set may be provided for each platform, and, in the case of Tizen, at least two API sets may be provided for each platform.

The application 370 (e.g., the application program 147), for example, may include at least one application capable of performing functions such as a home 371, a dialer 372, an SMS/MMS 373, an instant message (IM) 374, a browser 375, a camera 376, an alarm 377, a contact 378, a voice dial 379, an e-mail 380, a calendar 381, a media player 382, an album 383, a clock 384, health care (e.g., measure an exercise amount or blood sugar), or environmental information provision (e.g., provide air pressure, humidity, or temperature information). According to an embodiment of the present disclosure, the application 370 may include an information exchange application for supporting information exchange between the electronic device (e.g., the electronic device 101) and an external electronic device (e.g., the first electronic device 102 or the second external electronic device 104). The information exchange application may include, for example, a notification relay application for relaying specific information to the external electronic device or a device management application for managing the external electronic device. For example, the notification relay application may have a function for relaying, to an external electronic device (e.g., the first electronic device 102 or the second external electronic device 104), notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user. The device management application, for example, may manage (e.g., install, delete, or update) at least one function (e.g., turn-on/turn off of the external electronic device itself (or some elements) or the brightness (or resolution) adjustment of a display) of the external electronic device (e.g., the first electronic device 102 or the second external electronic device 104) communicating with the electronic device, an application running in the external electronic device, or a service (e.g., a call service, a message service, or the like) provided from the external electronic device. According to an embodiment of the present disclosure, the application 370 may include a specified application (e.g., a healthcare application of a mobile medical device) according to an attribute of the external electronic device (e.g., the first electronic device 102 or the second external electronic device 104). The application 370 may include an application received from an external electronic device (e.g., the first electronic device 102 or the second external electronic device 104). The application 370 may include a preloaded application or a third-party application downloadable from a server. The names of the elements of the program module 310 illustrated may vary with the type of an operating system. According to various embodiments of the present disclosure, at least a part of the program module 310 may be implemented with software, firmware, hardware, or a combination thereof. At least a part of the program module 310, for example, may be implemented (e.g., executed) by a processor (e.g., the processor 210). At least a part of the program module 310 may include, for example, a module, a program, a routine, sets of instructions, or a process for performing at least one function.

The terms " . . . unit", " . . . -er (-or)", and the like used below mean a unit for processing at least one function or operation, which may be implemented by hardware, software, or a combination of hardware and software.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed. At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 120), the processor may perform functions corresponding to the instructions. The computer-readable storage medium may be, for example, the memory 130. A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa. A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

Figure 4A:
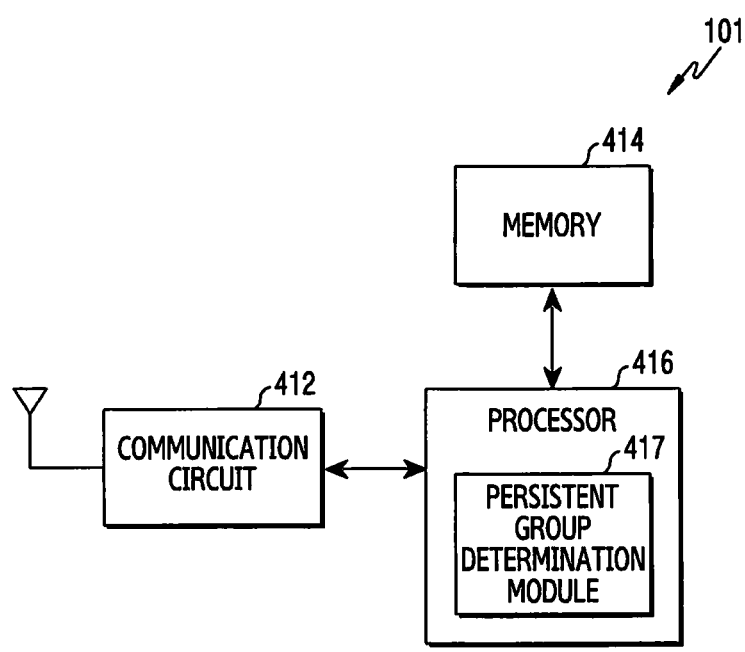
FIG. 4A illustrates an example of a functional configuration of an electronic device according to various embodiments.

FIG. 4A illustrates an example of the functional configuration of an electronic device according to various embodiments. FIG. 4A illustrates the functional configuration of the electronic device 101.

Referring to FIG. 4A, the electronic device 101 may include a communication circuit 412, a memory 414, and a processor 416.

The communication circuit 412 may receive or transmit a radio-frequency (RF) signal. To this end, the communication circuit 414 may include at least one antenna. The communication circuit 412 may down-convert the received signal to generate an intermediate frequency (IF) or baseband signal. The communication circuit 412 may include a reception-processing circuit that generates a processed baseband signal by filtering, decoding, and/or digitizing the baseband or IF signal. The reception-processing circuit may transmit the processed baseband signal to a speaker for the purpose of voice data, or may transmit the same to a processor 416 to perform further processing thereon (e.g., web browsing data). In addition, the communication circuit 412 may include a transmission-processing circuit. The transmission-processing circuit may receive outgoing baseband data (such as web data, email, or interactive video game data) from the processor 416. The transmission-processing circuit may encode, multiplex, and digitize the outgoing baseband data to produce a processed baseband or IF signal. The communication circuit 412 may up-convert the processed outgoing baseband or IF signal via the transmission-processing circuit into an RF signal that can be transmitted via an antenna. The communication circuit 412 may include the communication interface 170 of FIG. 1A or the communication circuit 220 of FIG. 2.

The memory 414 may store data such as a basic program, an application, or setting information for operating the device. The memory 414 may be composed of volatile memory, nonvolatile memory, or a combination of volatile memory and nonvolatile memory. The memory 414 may provide stored data in response to a request from the processor 416. The memory 414 may include a memory 130 of FIG. 1A or a memory 230 of FIG. 2.

The processor 416 may control the communication circuit 412 and the memory 414, which are operatively coupled to the processor 416. For example, the processor 416 may control the reception of a forward channel signal and the transmission of a reverse channel signal using the communication circuit 412. In some embodiments, the processor 416 may include at least one microprocessor or microcontroller. The processor 416 may execute another process or program existing in the electronic device 101. The processor 416 may store or retrieve data in the electronic device as required by an executing process. The processor 416 may be configured to execute an application in response to a signal received based on the operating system. In FIG. 4A, a single processor 416 is shown, but more than one processor may be included. The processor 416 may include a processor 120 of FIG. 1A or a processor 210 of FIG. 2.

A persistent group determination module 417 compares information for identifying a host device, which is received from a host device (e.g., the electronic device 108), with information included in a group management list stored in the memory 414 to determine a persistent group including a client device corresponding to the host device. The persistent group determination module 417 may be a set of instructions or code stored in the memory 414, instructions/code which at least temporarily reside in the processor 416, a storage space storing the instructions/code, or part of a circuit constituting the processor 416. In some embodiments, the persistent group may refer to at least one communication group capable of performing P2P wireless communication with a client device without omitting a communication method exchange procedure, an owner determination procedure, or an authentication procedure in a wireless P2P communication procedure. The persistent group may be referred to as a "fixed group", a "maintenance group", or another name having an equivalent technical meaning.

FIG. 4A shows that the electronic device 101 includes the communication circuit 412, the memory 414, and the processor 416, which are illustrative examples, and the device may further include other components. Some of the above-described communication circuit 412, memory 414, and processor 416 may be omitted. For example, the electronic device 101 may further include an interface (e.g., the interface 270) for connecting with a host device.

Figure 4B:
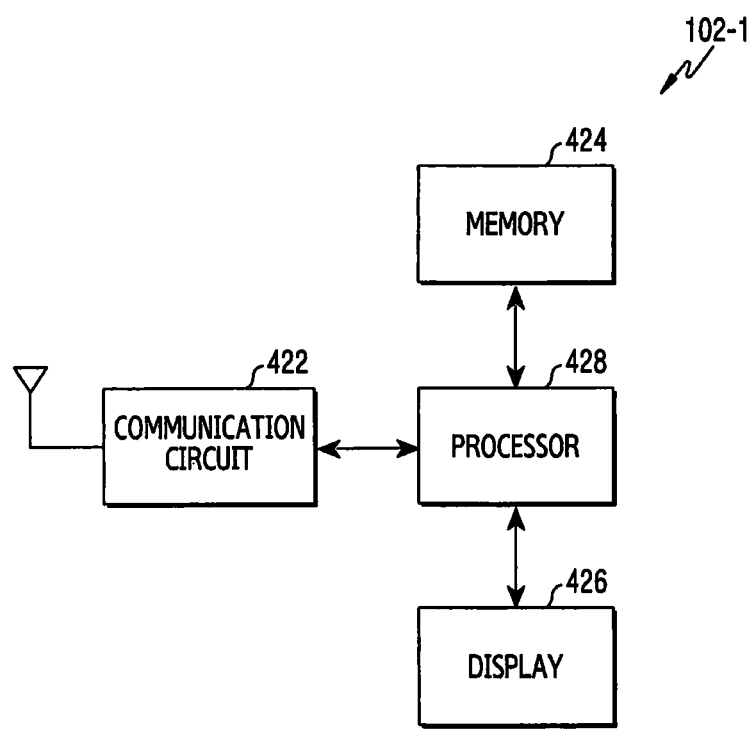
FIG. 4B illustrates an example of a functional configuration of an electronic device according to various embodiments.

FIG. 4B illustrates an example of the functional configuration of an electronic device according to various embodiments. FIG. 4B illustrates the functional configuration of the electronic device 102-1.

Referring to FIG. 4B, the electronic device 102-1 may include a communication circuit 422, a memory 424, a display 426, and a processor 428.

The communication circuit 422 may receive or transmit an RF signal. To this end, the communication circuit 422 may include at least one antenna. The communication circuit 422 may down-convert a received signal to produce an IF or baseband signal. The communication circuit 422 may include a reception-processing circuit that generates a processed baseband signal by filtering, decoding, and/or digitizing the baseband or IF signal. The reception-processing circuit may transmit the processed baseband signal to a speaker for the purpose of outputting voice data or may transmit the same to the processor 428 to perform further processing thereon (e.g., web browsing data). In addition, the communication circuit 422 may include a transmission-processing circuit. The transmission-processing circuit may receive outgoing baseband data (such as web data, email, or interactive video game data) from the processor 428. The transmission-processing circuit may encode, multiplex, and digitize the outgoing baseband data to produce a processed baseband or IF signal. The communication circuit 422 may up-convert the processed outgoing baseband or IF signal via a transmission-processing circuit into an RF signal that can be transmitted via an antenna. The communication circuit 422 may include the communication interface 170 of FIG. 1A or the communication circuit 220 of FIG. 2.

The memory 424 may store data such as a basic program, an application, or setting information for operating the device. The memory 424 may be composed of volatile memory, nonvolatile memory, or a combination of volatile memory and nonvolatile memory. The memory 424 may provide stored data in response to a request from the processor 428. The memory 424 may include the memory 130 of FIG. 1A or the memory 230 of FIG. 2.

The display 426 (e.g., the display 160 of FIG. 1A or the display 260 of FIG. 2) may be a liquid crystal screen capable of displaying text and/or images, a light-emitting diode display, or another kind of screen. The display 426 may display a screen corresponding to data received through the processor 428.

The processor 428 may control a communication circuit 422, the memory 424, and the display 426, which are functionally coupled with the processor 428. For example, the processor 428 may control the reception of a forward channel signal and the transmission of a reverse channel signal using the communication circuit 422. In some embodiments, the processor 428 may include at least one microprocessor or microcontroller. The processor 428 may execute other processes or programs residing on the device. The processor 428 may store or retrieve data in the electronic device as required by an executing process. The processor 428 may be configured to execute an application in response to a signal received based on an operating system. According to an embodiment, the processor 428 may perform wireless P2P communication with the electronic device 101. According to another embodiment, the processor 428 may perform wireless P2P communication based on a persistent group including the electronic device 102-1. In FIG. 4B, the processor 428 is shown in one configuration, but may include at least one processor. The processor 428 may include the processor 120 of FIG. 1A or the processor 210 of FIG. 2.

FIG. 4B shows that the electronic device 102-1 includes the communication circuit 422, the memory 424, the display 426, and the processor 428, which are illustrative examples, and the device may further include other components. Some of the above-described communication circuit 422, memory 424, display 426, and processor 428 may be omitted.

The electronic device 101 according to various embodiments may include: a housing; a USB connector (e.g., USB 274) configured to be connected to or integrated with the housing; a wireless communication circuit (e.g., the communication circuit 412) configured to be located in the housing; a processor (e.g., the processor 416) configured to be located in the housing and electrically coupled to the USB connector and the wireless communication circuit; and a memory (e.g., the memory 414) configured to be located in the housing and electrically coupled to the processor. The memory may store, when executed, instructions that cause the processor to determine whether the USB connector is electrically connected to a first external electronic device (e.g., the electronic device 108) having an identifier, to receive the identifier from the first external electronic device through the USB connector, to generate a wireless signal packet including the identifier, to receive a probe request from a second external electronic device (e.g., the electronic device 102-1) through the wireless communication circuit, to transmit the wireless signal packet to the second external electronic device through the wireless communication circuit, and to establish a wireless communication channel with the second external electronic device after transmitting the wireless signal packet.

The wireless communication circuit (e.g., the communication circuit 412) according to various embodiments may support a Wi-Fi direct protocol. The instructions according to various embodiments may further cause the processor (e.g., the processor 416) to determine whether the identifier exists in a list of identifiers stored in the memory (e.g., the memory 414) before generating the wireless signal packet. The instructions according to various embodiments may further cause the processor to determine a group for wireless communication with the second external electronic device (e.g., the electronic device 102-1) on the basis of the identifier. The group according to the various embodiments may include a persistent group for performing the wireless communication with the first external electronic device (e.g., the electronic device 108) without performing a discovery procedure, an owner determination procedure, or an authentication procedure.

The wireless signal packet according to various embodiments may include a device name field including the identifier. The wireless signal packet according to various embodiments may include an information field including the identifier. According to various embodiments, the identifier may include a medium access control (MAC) address of the first external electronic device (e.g., the electronic device 108).

Figure 5:
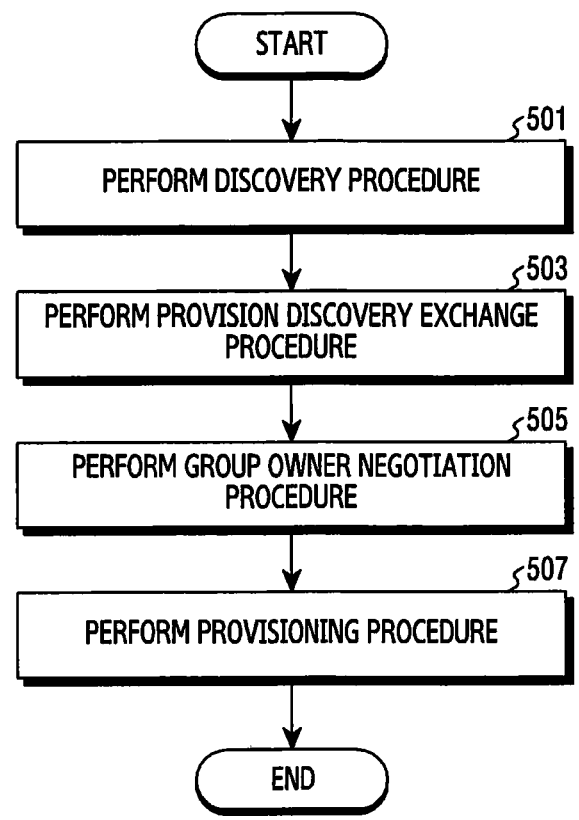
FIG. 5 is a flowchart illustrating wireless peer-to-peer (P2P) communication in an electronic device according to various embodiments.

FIG. 5 illustrates a flowchart for wireless P2P communication in an electronic device according to various embodiments. FIG. 5 illustrates a method for operating the electronic device 101.

Figure 6:
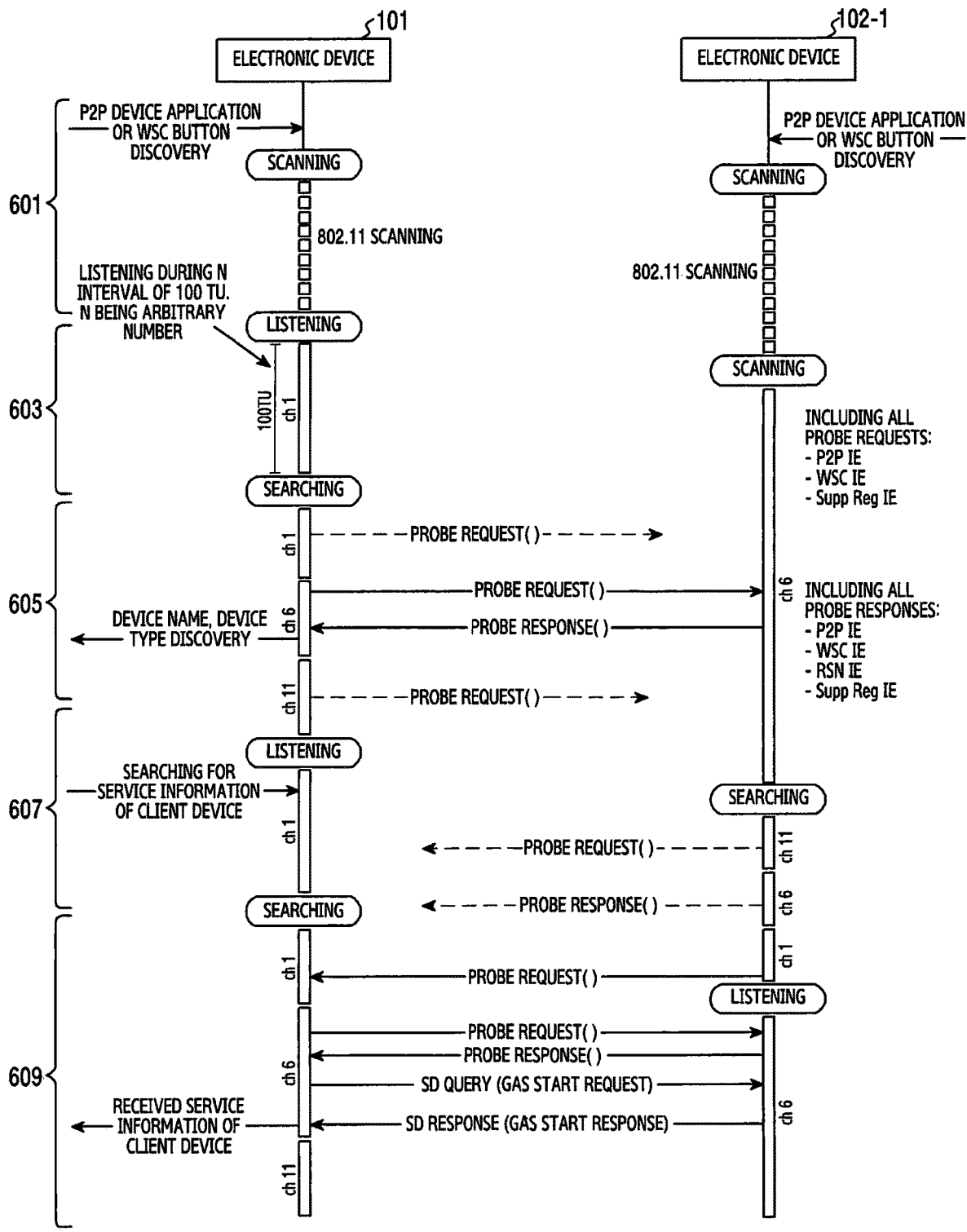
FIG. 6 illustrates signal exchange for a discovery procedure according to various.

Referring to FIG. 5, in operation 501, the processor (e.g., the processor 416) of the electronic device 101 may perform a discovery procedure. The processor of the electronic device 101 may detect the presence of a client device (e.g., the electronic device 102-1) for performing wireless P2P communication through a communication circuit (e.g., the communication circuit 412). In some embodiments, the discovery procedure may be a discovery procedure defined in a Wi-Fi direct standard. In other embodiments, the discovery procedure may use at least one of BLE, NFC, or BT. Specifically, referring to FIG. 6, the processor of the electronic device 101 may perform a scanning operation 601, a listening operation 603, a searching operation 603, a listening operation 607, and a searching operation 609.

The scanning operation 601 may be a procedure for identifying which channels are currently available for wireless P2P communication. That is, the processor of the electronic device 101 may scan all currently existing channels for a wireless P2P connection.

The listening operation 603 may refer to the state in which the processor of the electronic device 101 waits to receive a probe request signal that can be transmitted from a client device by selecting a specific channel. In some embodiments, the specific channel may include a social channel. For example, when a P2P connection is made between the electronic device 101 and the electronic device 102-1 in a band of 2.4 GHz, the social channel may be determined as channel 1, channel 6, or channel 11.

The searching operation 605 may be a procedure in which the processor of the electronic device 101 actively searches for the electronic device 102-1 through the probe request signal. The processor of the electronic device 101 may transmit a probe request signal to the electronic device 102-1 through the communication circuit (e.g., the communication circuit 412) of the electronic device 101, and may receive a probe response signal from the electronic device 102-1, thereby discovering the electronic device 102-1.

The listening operation 607 may be a procedure in which the processor of the electronic device 101 searches for service information of the electronic device 102-1. The searching operation 609 may be a procedure in which the processor of the electronic device 101 obtains service information of the electronic device 102-1.

In operation 503, the processor of the electronic device 101 may perform a provision discovery exchange procedure. The processor of the electronic device 101 may perform a procedure of exchanging information on a wireless P2P communication scheme with the electronic device 102-1. In some embodiments, the processor of the electronic device 101 may transmit a provision discovery request for notifying a client device of a Wi-Fi simple configuration (WSC) scheme in a desired manner. For example, the WSC scheme may include at least one of a push-button-control (PBC), a display-based PIN scheme, or a keypad-based PIN scheme. In some embodiments, the processor (e.g., the processor 428) of the electronic device 102-1 may receive a provision discovery request through the communication circuit (e.g., the communication circuit 422) of the electronic device 102-1, and may then display a pop-up through the display (e.g., the display 426) of the electronic device 102-1. For example, the pop-up may ask a user whether to allow wireless P2P communication, or may include a screen on which a PIN value required by the WSC is displayed in the case of the display-based PIN scheme and an input window for inputting a PIN value in the case of the keypad-based PIN scheme.

In operation 505, the processor of the electronic device 101 may perform a group owner negotiation procedure. The processor of the electronic device 101 may perform a procedure for determining a device that controls a wireless P2P communication procedure in P2P communication among the electronic device 101 and the electronic device 102-1. The processor of the electronic device 101 may determine the electronic device serving as an access point among the electronic device 101 and the electronic device 102-1. The electronic device serving as an access point may be referred to as a "group owner (GO)". The electronic device connected to the GO may be referred to as a "group client (GC)". In some embodiments, the processor of the electronic device 101 may transmit a GO negotiation request signal to the electronic device 102-1 via the communication circuit of the electronic device 101, and thereby may receive a GO negotiation response signal from a client device. The processor of the electronic device 101 compares a group owner intent value of the electronic device 101 with a group owner intent value of the electronic device 102-1 through the group owner negotiation procedure, thereby determining the electronic device designating the larger value as the GO. In some embodiments, the processor of the electronic device 101 may determine at least one of an attribute of a P2P group, an operating channel, or a listening timing, which are generated after the P2P connection through the group owner procedure.

In operation 507, the processor of the electronic device 101 may perform a provisioning procedure. The processor of the electronic device 101 may perform an authentication procedure. The processor of the electronic device 101 may exchange credentials with the electronic device 102-1 through the communication circuit of the electronic device 101. In some embodiments, in the case of a Wi-Fi protected setup (WPS) scheme, the processor of the electronic device 101, which is the GO, operates as a Wi-Fi simple configuration (WSC) register, and the client device, which is the GC, operates as a WSC enrollee.

In some embodiments, the processor of the electronic device 101 may additionally perform a four-way handshake procedure with the client device. The processor of the electronic device 101 may finally perform a P2P connection with the client device. In some embodiments, in the four-way handshake procedure, the credentials can be used for connection of the client device to the electronic device 101.

In general, when the client device is included in a temporary group for wireless P2P communication, the electronic device 101 should perform the discovery procedure, provision discovery exchange procedure, group owner negotiation procedure, and provisioning procedure of FIG. 5 whenever performing wireless P2P communication with the client device. On the other hand, when the client device is included in a persistent group for wireless P2P communication, the electronic device 101 may omit the group owner negotiation procedure and provisioning procedure of FIG. 5 when performing wireless P2P communication with the client device. That is, in a wireless P2P communication reconnection situation, the electronic device 101 may quickly perform reconnection without additional authentication.

However, in the case in which the electronic device 101 connected to a host device (e.g., the electronic device 108) determines the persistent group for wireless P2P communication, when reconnection to the persistent group including the client device is performed using only information on the electronic device 101 regardless of information on the host device to which the electronic device 101 is connected, security problems can occur. For example, even when the electronic device 101 is connected to the PC-B as the host device although the electronic device 101 generates and authenticates the persistent group including the client device only when the electronic device 101 is connected to a PC-A as the host device, the client device may recognize the corresponding situation as the situation in which the electronic device 101 is connected to the PC-A, and may automatically perform wireless P2P communication with a PC-B through the electronic device 101. In this case, a problem may occur in that a malicious user of the PC-B can read information of the client device without authenticating the client device.

According to various embodiments, the electronic device 101 connected to the host device may perform wireless P2P communication with the client device without a security problem.

Figure 7A:
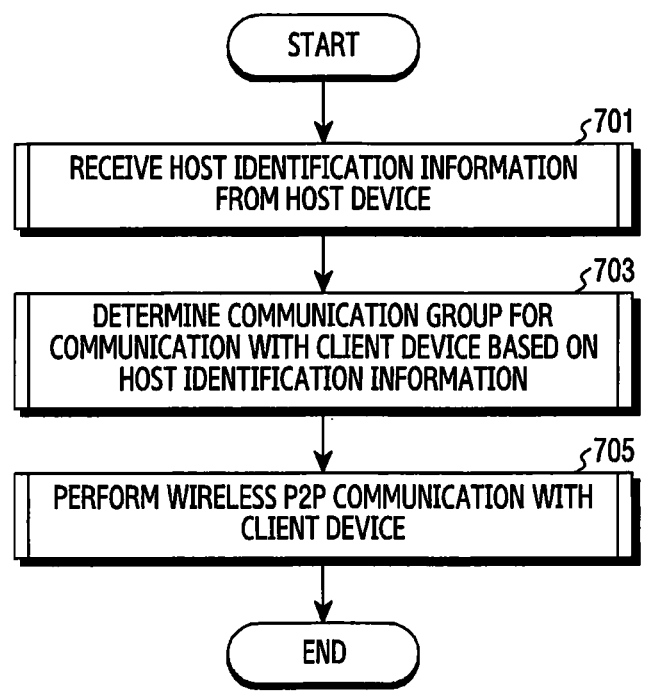
FIG. 7A illustrates another flowchart for P2P communication in an electronic device according to various embodiments.

FIG. 7A illustrates another flowchart for P2P communication in an electronic device according to various embodiments. 7A illustrates a method for operating the electronic device 101.

Referring to FIG. 7A, in operation 701, the processor (e.g., the processor 416 of the electronic device 101) may receive information for identifying a host device from a host device (e.g., the electronic device 108) through the communication circuit (e.g., the communication circuit 412) of the electronic device 101. For example, the information for identifying the host device may include at least one of an identifier of the host device, a serial number thereof, a model number thereof, and manufacturer information thereof, a medium access control (MAC) address, user account information, or basic input/output system (BIOS) information. Hereinafter, for convenience of description, the "information for identifying host device" may be referred to as "host identification information". In some embodiments, when the processor 416 of the electronic device 101 is inserted into the host device through a USB interface (e.g., the USB 274), the processor 416 may receive host identification information from the host device. In other embodiments, the processor 416 of the electronic device 101 may receive host identification information from the host device when receiving a signal for wireless P2P communication from the client device (e.g., the electronic device 102-1).

In operation 703, the processor 416 of the electronic device 101 may determine a communication group for communication with the client device based on the host identification information. For example, the communication group may be a persistent group. In some embodiments, when the processor 416 of the electronic device 101 receives a signal for wireless P2P communication from the client device through the communication circuit of the electronic device 101, the processor 416 may determine the communication group including the client device based on the host identification information. In other embodiments, the processor 416 of the electronic device 101 may compare the host identification information with information included in a group management list stored in the memory (e.g., the memory 414) of the electronic device 101, thereby determining the communication group including the client device. For example, if the host identification information corresponds to at least one group included in the group management list stored in the electronic device 101, the processor 416 of the electronic device 101 may determine the communication group for communication with the client device among at least one group. On the other hand, if the host identification information does not correspond to the at least one group included in the group management list stored in the electronic device 101, the processor 416 of the electronic device 101 may generate a communication group in which the electronic device 101 operates as an owner.

In operation 705, the processor 416 of the electronic device 101 may perform wireless P2P communication with the client device through the communication circuit of the electronic device 101. In some embodiments, the processor 416 of the electronic device 101 may receive a request for wireless P2P communication from the client device via the communication circuit of the electronic device 101 and may transmit a response to the request for wireless P2P communication to the client device, thereby performing P2P communication.

Figure 7B:
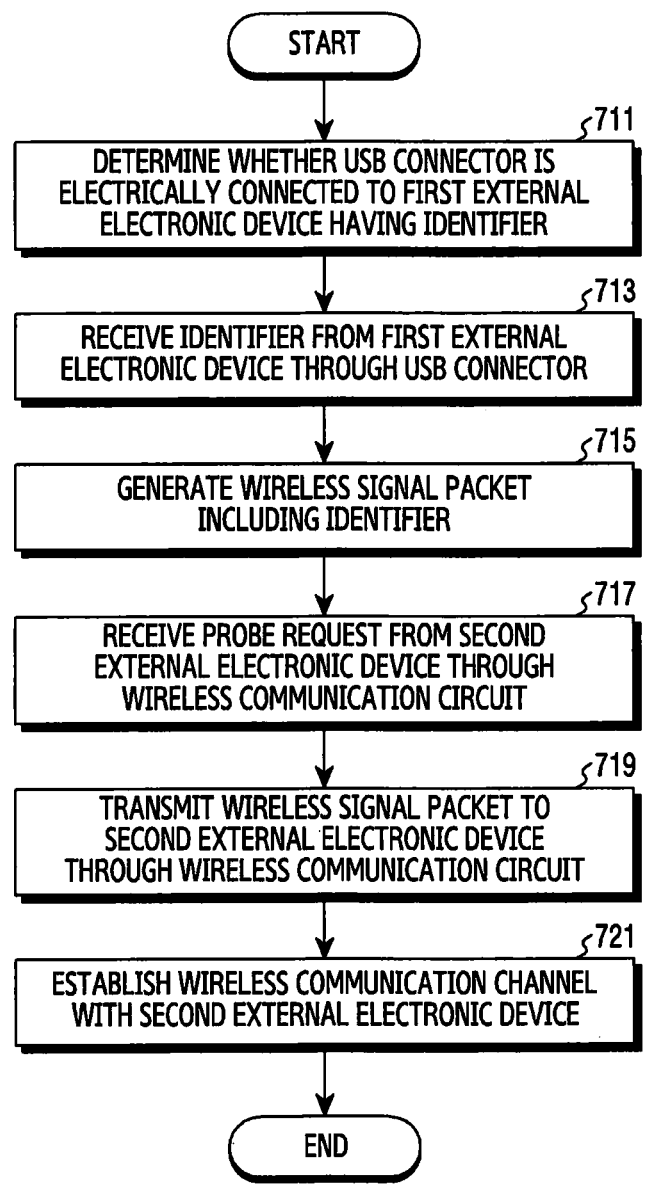
FIG. 7B is still another flowchart illustrating another type of P2P communication in an electronic device according to various embodiments of the disclosure.

FIG. 7B illustrates a flowchart illustrating another type of P2P communication in an electronic device according to various embodiments. FIG. 7B illustrates a method for operating the electronic device 101.

Referring to FIG. 7B, in operation 711, the processor (e.g., the processor 416) of the electronic device 101 may determine whether a USB connector (e.g., the USB 274 of FIG. 2) included in the electronic device 101 is electrically connected to a first external electronic device having an identifier. For example, the first external electronic device may refer to a host device (e.g., the electronic device 108).

In operation 713, the processor 416 of the electronic device 101 may receive the identifier of the first external electronic device from the first external electronic device 108 through the USB connector. In some embodiments, the identifier of the first external electronic device may include the MAC address of the first external electronic device.

In operation 715, the processor 416 of the electronic device 101 may generate a wireless signal packet including the identifier of the first external electronic device. In some embodiments, the processor 416 of the electronic device 101 may determine whether the identifier of the first external electronic device is present in a list of identifiers stored in the memory (e.g., the memory 414) of the electronic device 101, and may generate the wireless signal packet including the identifier of the first external electronic device.

In operation 717, the processor 416 of the electronic device 101 may receive a probe request signal from a second external electronic device through the wireless communication circuit (e.g., the communication circuit 412) of the electronic device 101. For example, the second external electronic device may be a client device (e.g., the electronic device 102-1). In some embodiments, the wireless communication circuit of the electronic device 101 may support a Wi-Fi direct protocol.

In operation 719, the processor of the electronic device 101 may transmit the wireless signal packet to the second external electronic device 102-1 through the wireless communication circuit of the electronic device 101. In some embodiments, the wireless signal packet may include a device name field that includes the identifier of the first external electronic device. In other embodiments, the wireless signal packet may include an information field that includes the identifier of the first external electronic device.

In operation 721, the processor of the electronic device 101 may generate a wireless communication channel with the second external electronic device. In some embodiments, the wireless communication channel may be a channel for wireless P2P communication.

Figure 8:
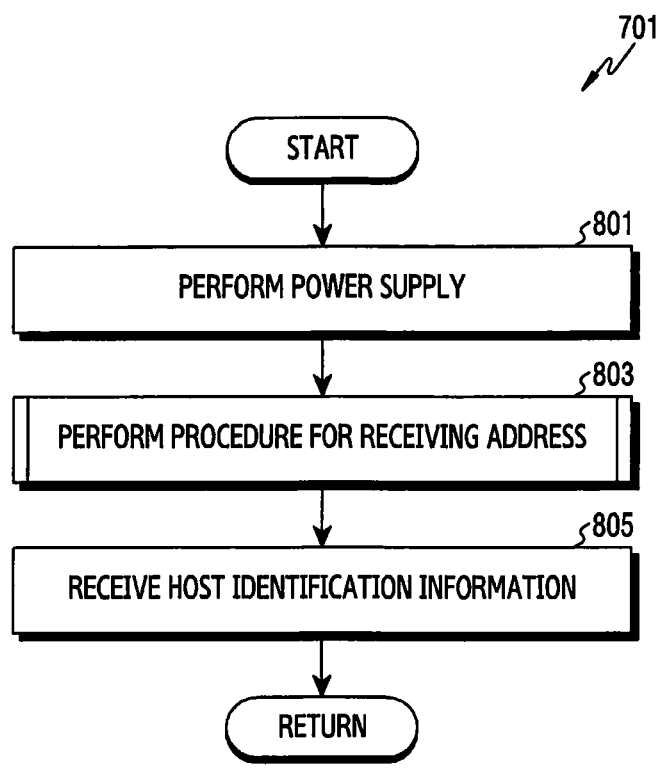
FIG. 8 illustrates a flowchart for receiving host identification information in an electronic device according to various embodiments.

FIG. 8 illustrates a flowchart for receiving host identification information in an electronic device according to various embodiments. FIG. 8 illustrates a method for operating the electronic device 101. FIG. 8 illustrates more specific sub-operations of operation 701 of FIG. 7.

Referring to FIG. 8, in operation 801, the processor (e.g., the processor 416) of the electronic device 101 may receive power from a host device (e.g., the electronic device 108). In some embodiments, the electronic device 101 may be inserted into a USB port of the host device to supply power. In other embodiments, when the electronic device 101 is wirelessly connected to the host device, operation 801 may be omitted.

In operation 803, the processor 416 of the electronic device 101 may perform a procedure for receiving an address for the electronic device 101 from the host device. In some embodiments, a procedure for the processor 416 of the electronic device 101 to receive the address for the electronic device 101 from the host device may be referred to as a "USB enumeration procedure".

In operation 805, the processor 416 of the electronic device 101 may receive host identification information from the host device through a wired connection of the electronic device 101. In some embodiments, the processor 416 of the electronic device 101 may receive the host identification information from the host device through a USB interface. The processor of the electronic device 101 may determine that the host device is an authorized electronic device and may store the received host identification information in the memory (e.g., the memory 414) of the electronic device 101.

Figure 9:
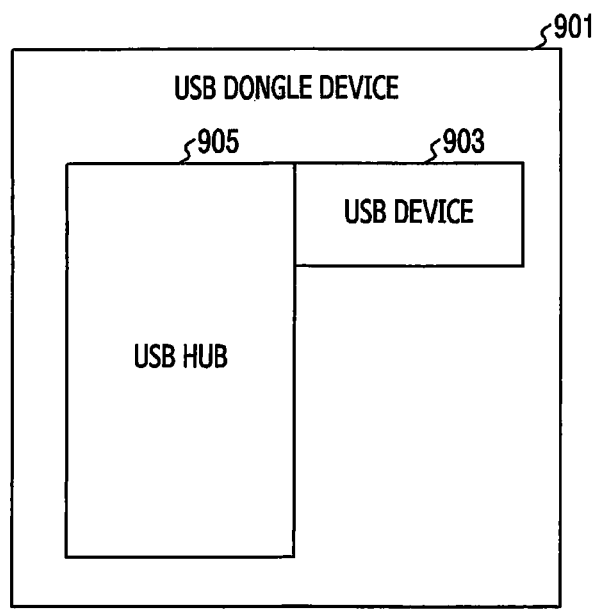
FIG. 9 illustrates an example of another functional configuration of an electronic device according to various embodiments.

In some embodiments, the electronic device 101 may receive a dynamic host configuration (DHCP) discovery message including the host identification information from the host device operating as a DHCP client through the communication circuit (e.g., the communication circuit 412) of the electronic device 101 while the electronic device 101 operates as a DHCP server. For example, the DHCP discovery message may be a message that is transmitted by the host device to receive an IP address from the electronic device 101. In another example, the DHCP discovery message may include a field for a name (e.g., a PC name) of the host device as an option item. Referring to FIG. 9, when the electronic device 101 operates as a DHCP server and the host device operates as a DHCP client, the electronic device 101 may include a USB device 903 and a USB hub 905. The USB device 903 may be a virtual USB device that provides a remote network driver interface specification (RNDIS) function. The USB hub 905 may be a device allowing at least one electronic device supporting the USB interface to be inserted into one USB port. In some embodiments, the virtual USB device 903 providing the RNDIS function can be connected to the USB port of the USB hub 905. Through this, when the electronic device 101 is connected to the host device, the host device may recognize a network card called RNDIS, and the host device may register the network card in the device manager of the host device.

In other embodiments, when the electronic device 101 and the host device support universal plug and play (UPNP), the processor of the electronic device 101 may receive the name of the host device and a universally unique identifier (UUID) on a UPNP protocol from the host device through the communication circuit of the electronic device 101. The name of the host device and the UUID on the UPNP protocol may be used for the electronic device 101 to identify the host device.

In other embodiments, when a vendor driver is installed in the host device, the processor 416 of the electronic device 101 may receive a USB vendor command (CMD) including the host identification information from the host device. The USB vendor CMD may mean a command for a USB vendor, and the USB vendor CMD may be transmitted to the electronic device 101 while a USB enumeration procedure is performed. For example, the vendor driver may be installed in the host device through the electronic device 101 when the electronic device 101 is connected via wire to the host device. As another example, the vendor driver may be installed in the host device through an external network when the electronic device 101 is connected via wire to the host device. As another example, the vendor driver may be independently installed in the host device regardless of the connection between the electronic device 101 and the host device, or may be previously installed in the host device. In some embodiments, the vendor driver can be used to generate a unique identification value (e.g., a globally unique identifier (GUID) or PC account information) for identifying the host device. In other embodiments, the vendor driver may be used to store and manage various pieces of information related to the host device.

In some embodiments, a USB connection between the electronic device 101 and the host device may be a USB connection conforming to a Type C standard. In this case, the electronic device 101 to which the Type C standard is applied may switch between a USB host role and a USB client role in real time. Hereinafter, an embodiment of receiving the host identification information through role swap of the electronic device 101 will be described with reference to FIG. 10.

Figure 10:
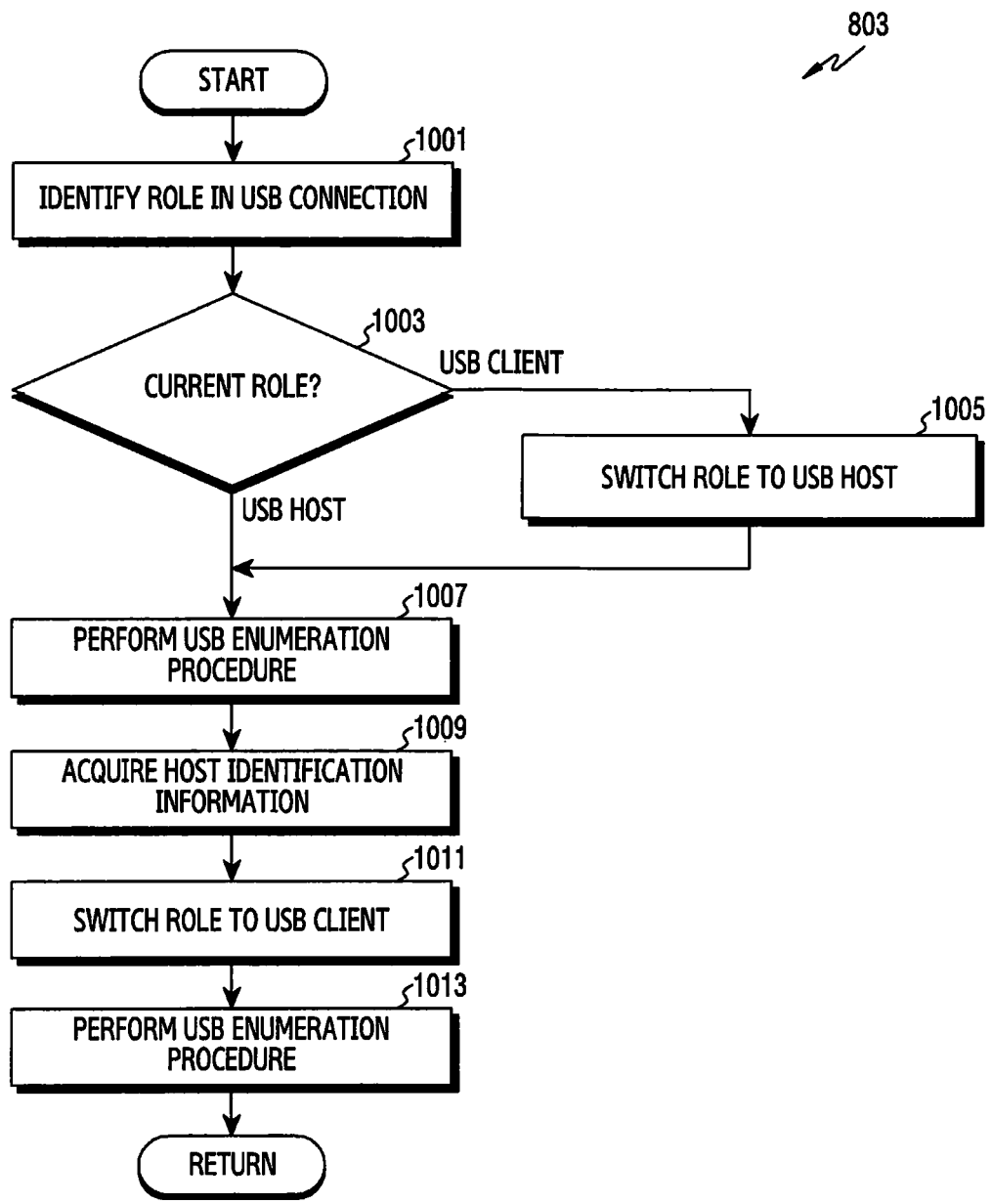
FIG. 10 illustrates a flowchart for receiving host identification information through role swap according to various embodiments.

FIG. 10 illustrates a flowchart for receiving host identification information through role swap according to various embodiments. FIG. 10 illustrates a method for operating the electronic device 101. FIG. 10 illustrates more specific sub-operations of operation 803 of FIG. 8.

Referring to FIG. 10, in operation 1001, the processor (e.g., the processor 416) of the electronic device 101 may identify the role (e.g., a USB host or a USB client) of the electronic device 101 in the USB connection that conforms to the Type C standard. The electronic device 101 to which the USB Type C standard is applied is a dual-role device, and the role of the electronic device 101 may be determined when the USB connection is established.

In operation 1003, the processor of the electronic device 101 may determine whether the current role of the electronic device 101 is that of a USB client or a USB host. If the current role of the electronic device 101 is that of a USB client, in operation 1005, the processor of the electronic device 101 may switch the role of the electronic device 101 to the USB host. In order to receive the host identification information, since the electronic device 101 should be operating as the USB host, when the electronic device 101 is the USB client, the role of the electronic device 101 can be switched to the USB host. When the current role of the electronic device 101 is the USB host or when the current role of the electronic device 101 is changed to the USB host from the USB client, in operation 1007, the processor of the electronic device 101 may perform the USB enumeration procedure. In some embodiments, the processor of the electronic device 101 may assign an address for the host device to the host device (e.g., the electronic device 108).

In operation 1009, the processor of the electronic device 101 may receive the host identification information from the host device (e.g., the electronic device 108) through the communication circuit (e.g., the communication circuit 412) of the electronic device 101. For example, the host identification information may include at least one of a vendor ID, a host device ID, or information on a USB serial number.

In operation 1011, the processor of the electronic device 101 may switch the role of the electronic device 101 to that of a USB client. For example, the processor of the electronic device 101 may operate as the USB host through the communication circuit of the electronic device 101 to receive information for identifying the host device (e.g., the electronic device 108), and then may switch the roles again to operate as the USB client, for example, as a native function, such as a USB hub.

In operation 1013, the processor of the electronic device 101 may perform the USB enumeration procedure. In some embodiments, the processor of the electronic device 101 may be assigned with an address for the electronic device 101 from the host device.

According to various embodiments, the processor of the electronic device 101 may obtain the host identification information from the host device. The processor of the electronic device 101 may determine a persistent group for wireless P2P communication with the client device based on the host identification information. Hereinafter, a specific embodiment for determining a persistent group for wireless P2P communication with a client device based on host identification information will be described with reference to FIG. 11.

Figure 11:
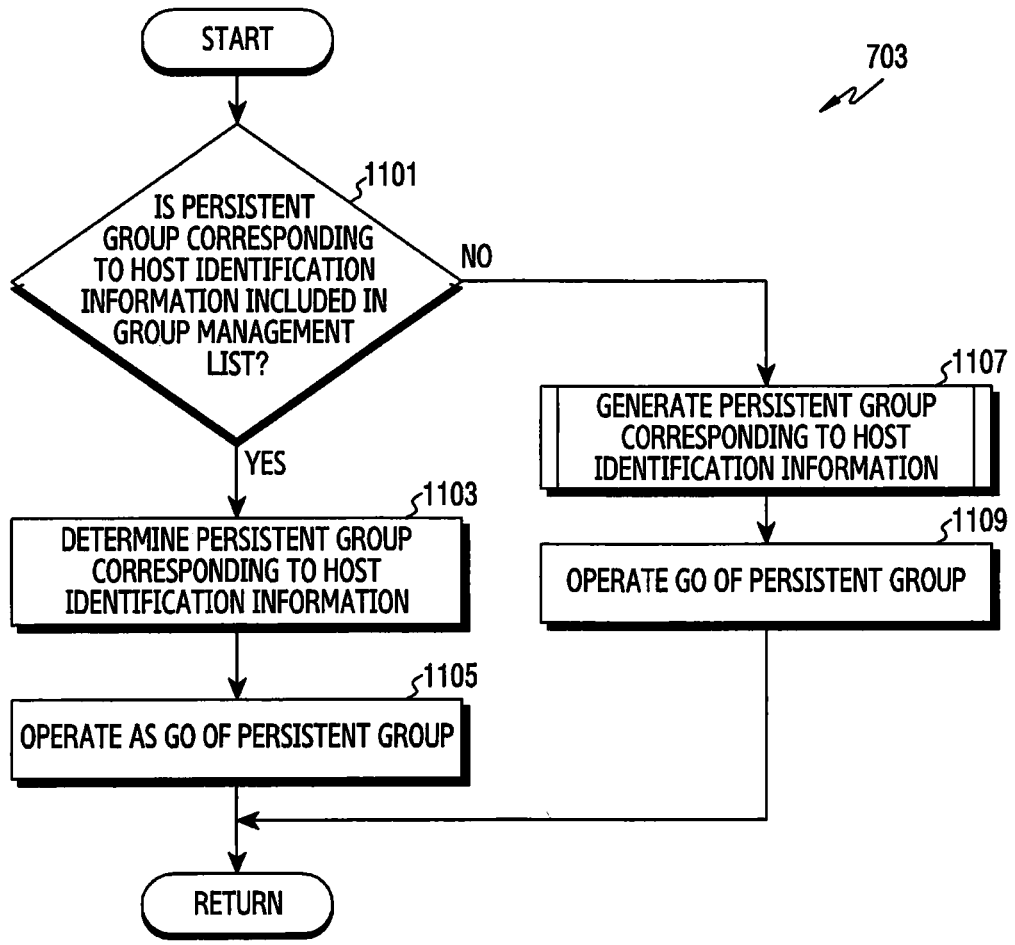
FIG. 11 illustrates a flowchart for determining a persistence group corresponding to a host device according to various embodiments.

FIG. 11 illustrates a flowchart for determining a persistent group corresponding to a host device according to various embodiments. FIG. 11 illustrates a method for operating the electronic device 101. FIG. 11 illustrates more specific sub-operations of operation 703 of FIG. 7.

Referring to FIG. 11, in operation 1101, the processor (e.g., the processor 416) of the electronic device 101 may determine whether a persistent group corresponding to information for identifying a host device (e.g., the electronic device 108) is included in a group management list stored in the memory (e.g., the memory 414) of the electronic device 101. For convenience of description, the persistent group corresponding to the host identification information is referred to as a "persistent group for a host device". In some embodiments, the processor of the electronic device 101 may determine whether the host identification information is included in a wireless-fidelity direct (WFD) group list.

If the persistent group for the host device is included in the group management list of the electronic device 101, in operation 1103, the electronic device 101 may determine the persistent group for the host device. That is, the electronic device 101 may determine the persistent group for the host device included in the group management list of the electronic device 101 as a persistent group for performing wireless P2P communication.

In operation 1105, the electronic device 101 may operate as the GO of the persistent group for the host device. In some embodiments, the fact that the persistent group for the host device is included in the group management list of the electronic device 101 means that the host device has previously performed wireless P2P communication with the client device through the electronic device 101. This may mean that the corresponding host device has previously authenticated the client device for wireless P2P communication.

On the other hand, when the persistent group for the host device is not included in the group management list of the electronic device 101, in operation 1107, the processor of the electronic device 101 may generate the persistent group for the host device. The generated persistent group for the host device may be stored in the group management list of the electronic device 101. In some embodiments, the fact that the persistent group for the host device is not included in the group management list of the electronic device 101 may mean that the host device has not previously performed wireless P2P communication with the client device through the electronic device 101. This may mean that the corresponding host device has not previously authenticated the client device for wireless P2P communication.

In operation 1109, the electronic device 101 can operate as the GO of the persistent group for the host device. In some embodiments, the electronic device 101 operating as the GO may serve as an AP of a Wi-Fi network (or wireless local area network (WLAN)).

Figure 12:
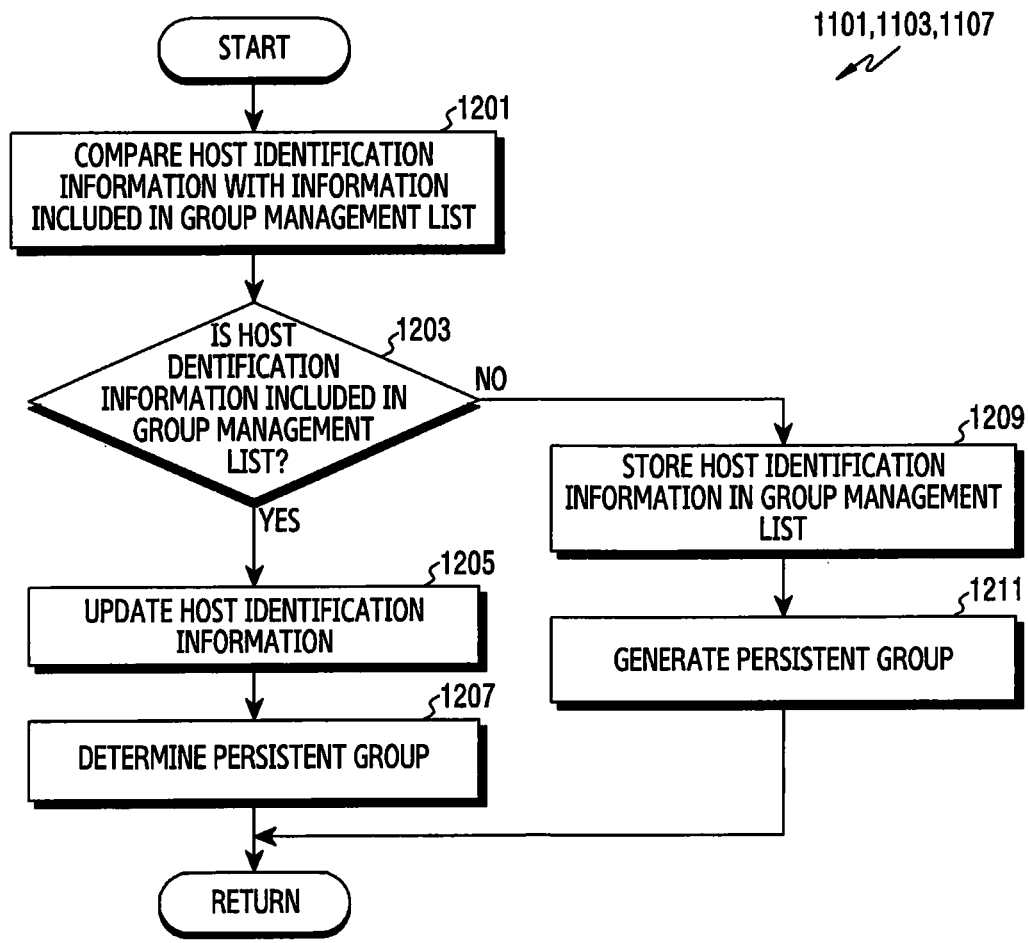
FIG. 12 illustrates a flowchart for storing a group management list according to various embodiments.

FIG. 12 illustrates a flowchart for storing a group management list according to various embodiments. FIG. 12 illustrates a method for operating the electronic device 101. FIG. 12 illustrates more specific sub-operations of operations 1101 and 1105 of FIG. 11.

Referring to FIG. 12, in operation 1201, the processor (e.g., the processor 416) of the electronic device 101 may compare host identification information received from a host device (e.g., the electronic device 108) with information stored in a group management list. In some embodiments, the host identification information may include at least one of an identifier of the host device, a name of the host device, a MAC address, or user account information. For example, the processor 416 of the electronic device 101 may compare the MAC address included in the host identification information received from the host device with the MAC address stored in the group management list. In operation 1203, the processor 416 of the electronic device 101 may determine whether the host identification information is included in the group management list.

If the host identification information is included in the group management list, in operation 1205, the processor 416 of the electronic device 101 may update the host identification information included in the group management list. In some embodiments, when at least one element constituting the host identification information received from the host device is changed, the host identification information previously included in the group management list may be updated by reflecting the changed element among the at least one element constituting the host identification information received from the host device. In other embodiments, if the at least one element constituting the host identification information received from the host device is not changed, operation 1205 may be omitted.

In operation 1207, the processor 416 of the electronic device 101 may determine a persistent group corresponding to the host identification information. In some embodiments, the processor 416 of the electronic device 101 may determine the persistent group using a group ID corresponding to the MAC address in the group list.

On the other hand, if the host identification information is not included in the group management list, in operation 1209, the processor 416 of the electronic device 101 may store, in the group management list, the host identification information in the memory (e.g., the memory 414) of the electronic device 101. In some embodiments, when it is determined that there is no device the same as the host device in the group management list, the processor 416 of the electronic device 101 may store, in the group management list, the at least one element constituting the host identification information in the memory of the electronic device 101.

In operation 1211, the processor 416 of the electronic device 101 may generate a persistent group corresponding to the host identification information. In some embodiments, the processor 416 of the electronic device 101 may generate the persistent group corresponding to a group ID generated using the host identification information.

Figure 13:
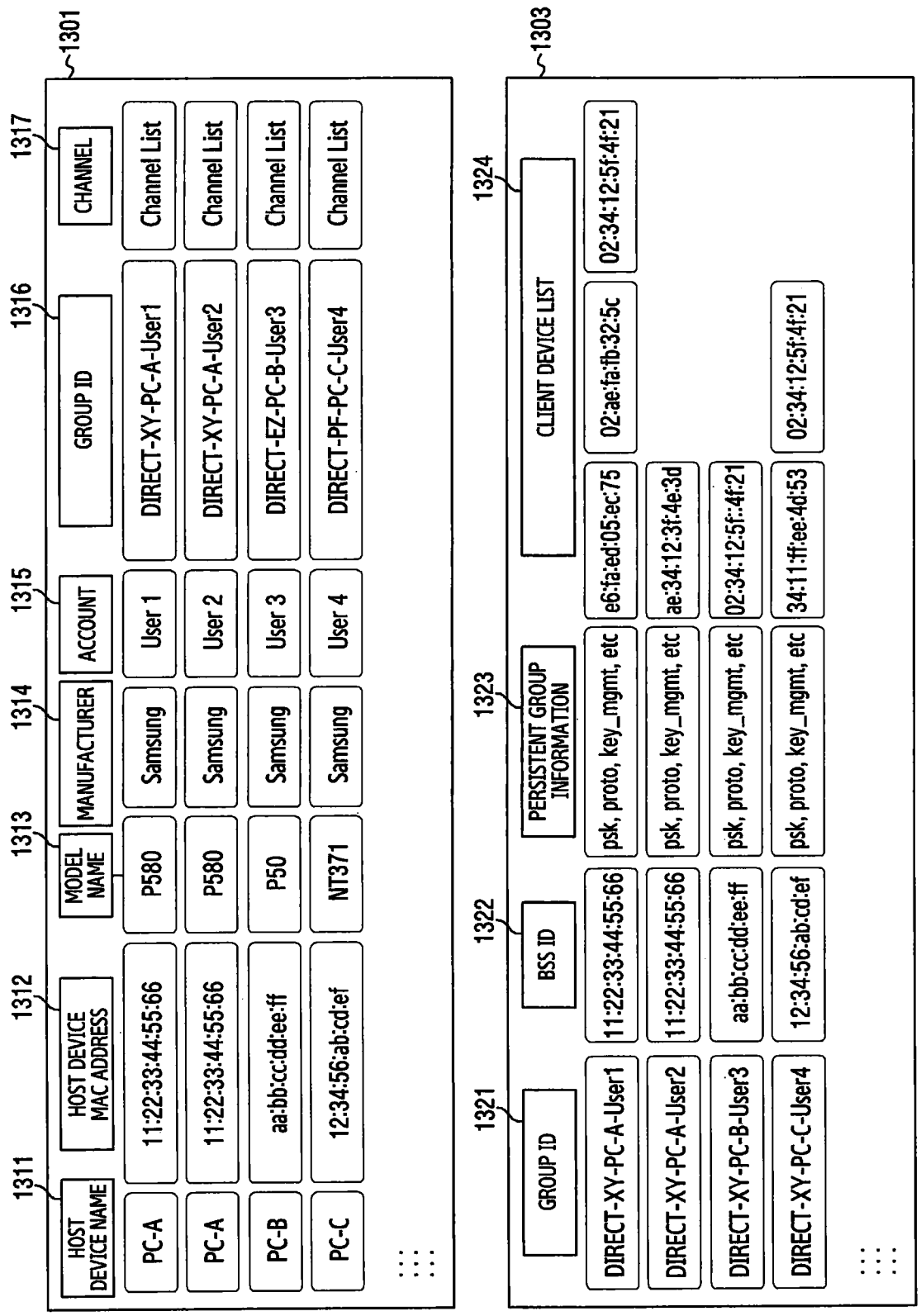
FIG. 13 illustrates an example of a group management list and a client list according to various embodiments.

FIG. 13 illustrates an example of a group management list and a client list according to various embodiments.

Referring to FIG. 13, a group management list 1301 is a field, and may include at least one of a host device name 1311, a host device MAC address 1312, a model name 1313, a manufacturer 1314, a user account 1315, a group ID 1316, or a channel 1317.

The host device name 1311 may be generated based on host identification information received from a host device (e.g., the electronic device 108). The generated host device name 1311 may be stored in the group management list 1301.

The group ID 1316 may refer to information for identifying a persistent group corresponding to the host device name 1311. The group ID 1316 may be generated based on information on a client device (e.g., the electronic device 102-1) that has performed wireless P2P communication. For example, the information on the client device may refer to information received from the client device through at least one of a discovery procedure, a provision discovery exchange procedure, a group owner negotiation procedure, or a provisioning procedure performed during wireless P2P communication.

When the host device name 1311 is updated, the group ID 1316 included in the group management list 1301 may also be updated to thus correspond to the updated host device name 1311. For example, in the state in which the host device name 1311 is initially PC-A and the group ID 1316 is DIRECT-XY-PC-A-USER1, when the name of the host device is changed to NotePC-A, the host device name 1311 and the group ID 1316 may be updated to NotePC-A and DIRECT-XY-NotePC-A-USER1, respectively, in the group management list 1301. When the field value is updated in this way, since the value of the group ID 1316 is changed but corresponds to the same group, the same persistent group may be determined, and the client list managed by the persistent group is also the same, so that automatic connection may be allowed at the time of reconnection. That is, since the group ID 1316 before the update and the group ID 1316 after the update indicate the same persistent group, the same persistent group may be determined, and the client list may also be the same.

The client list 1303 is a field, and may include at least one of a group ID 1321, a basic service set identifier (BSSID) 1322, persistent group information 1323, or a client device list 1324.

The group ID 1321 may refer to information for identifying a persistent group corresponding to the host device name 1311. The group ID 1321 may be generated based on information on a client device that has performed wireless P2P communication.

The client device list 1324 may be generated based on information for identifying the client device. In some embodiments, whenever the client device included in the persistent group corresponding to the group ID is added, information for identifying the added client device may be added to the client device list 1324.

When the group ID 1321 is updated, the client device list 1324 may include identifiers for the same client devices. For example, even if the group ID 1321 is updated from DIRECT-XY-PC-A-USER1 to DIRECT-XY-NotePC-A-USER1, the client device list 1324 may include at least one of identifiers for the same client devices, that is, e6:fa:ed:05:ec:75, 02:ae:fa:fb:32:5c, or 02:34:12:5f:4f:21. That is, since the group ID 1321 before being updated and the group ID 1321 after being updated indicate the same persistent group, the client devices included in the client device list 1324 corresponding to the group ID 1321 after being updated may be the same as the client devices included in the client device list 1324 corresponding to the group ID 1321 before being updated. In some embodiments, the group ID 1321 may be determined based on at least one of the host device name 1311, the host device MAC address 1312, or the user account 1315.

Figure 14:
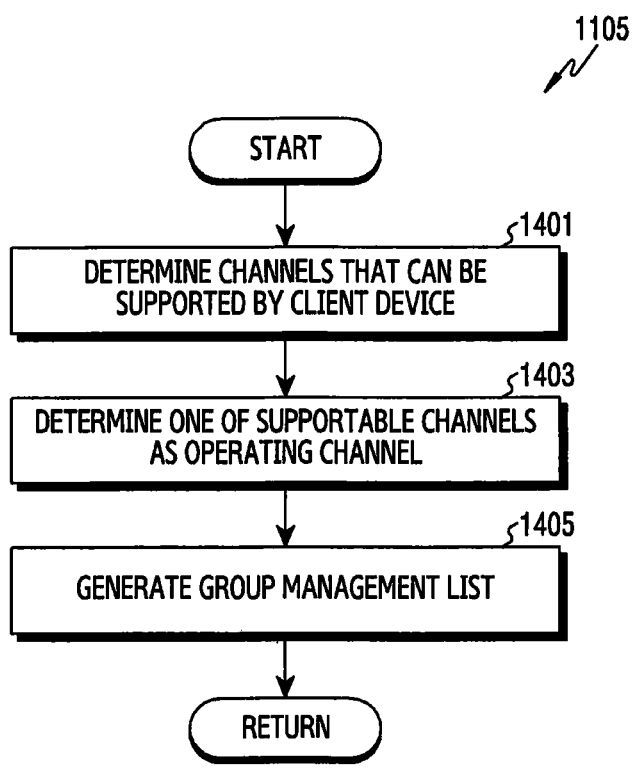
FIG. 14 illustrates a flowchart for managing a group management list by merging channel information in a group management list according to various embodiments.

FIG. 14 illustrates a flowchart for managing a group management list by merging channel information with a group management list according to various embodiments. FIG. 14 illustrates a method for operating the electronic device 101. FIG. 14 illustrates more specific sub-operations of operation 1105 of FIG. 11.

Referring to FIG. 14, in operation 1401, the processor (e.g., the processor 416) of the electronic device 101 may determine channels that can be supported by the client device (e.g., the electronic device 102-1). The channels that can be supported by the client device may be stored in a channel field (e.g., the channel field 1317 of FIG. 13) of the group management list (e.g., the group management list 1301 of FIG. 13).

In operation 1403, the processor 416 of the electronic device 101 may determine one of the channels that can be supported by the client device to be an operating channel. In some embodiments, the processor of the electronic device 101 may determine one of the channels that can be supported by the client device to be an operating channel that is different from an operating channel (e.g., a channel randomly selected among channels 2.4 GHz and 5 GHz) when the operating channel initially operates as a GO.

In operation 1405, the processor 416 of the electronic device 101 may generate the group management list. In some embodiments, the group management list may include information on the channels supported by the client device and information on the operating channel. By using the group management list that includes the information on the supportable channels and the information on the operating channel of the client device by the processor 416 of the electronic device 101, the probability of failure of wireless P2P communication with the client device may be reduced.

Figure 15:
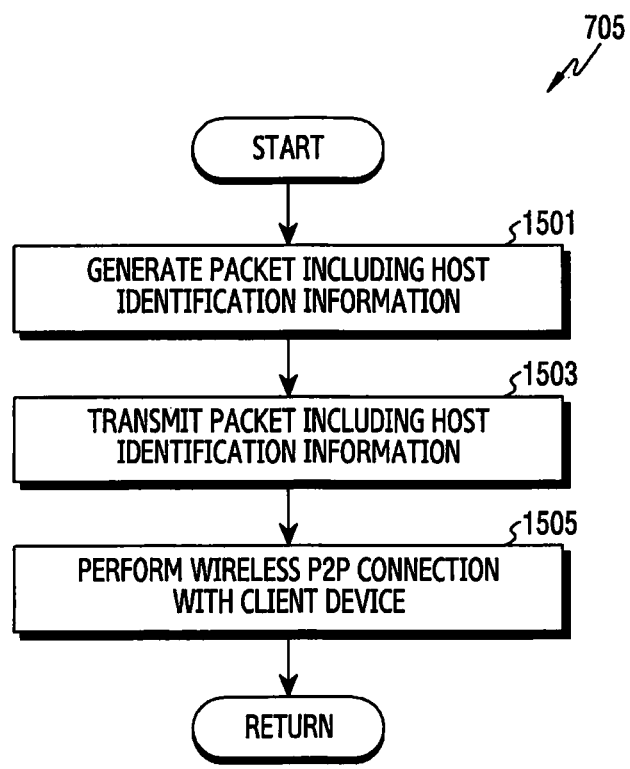
FIG. 15 illustrates a flowchart for transmitting host identification information to a client device according to various embodiments.

FIG. 15 illustrates a flowchart for transmitting host identification information to a client device according to various embodiments. FIG. 15 illustrates a method for operating the electronic device 101. FIG. 15 illustrates more specific sub-operations of operation 705 of FIG. 7.

Figure 16A:
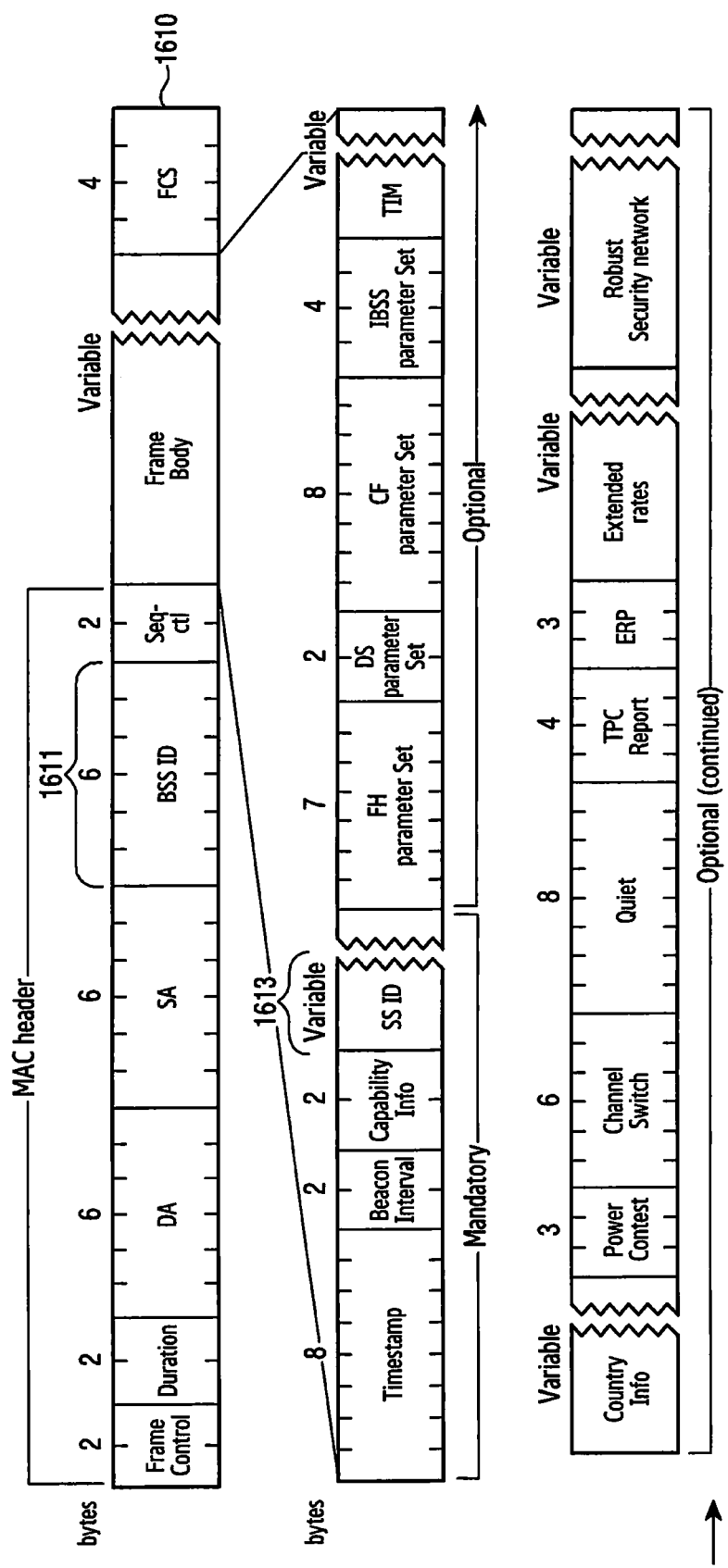
FIG. 16A illustrates an example of a beacon frame for transmitting host identification information according to various embodiments.
Figure 16B:
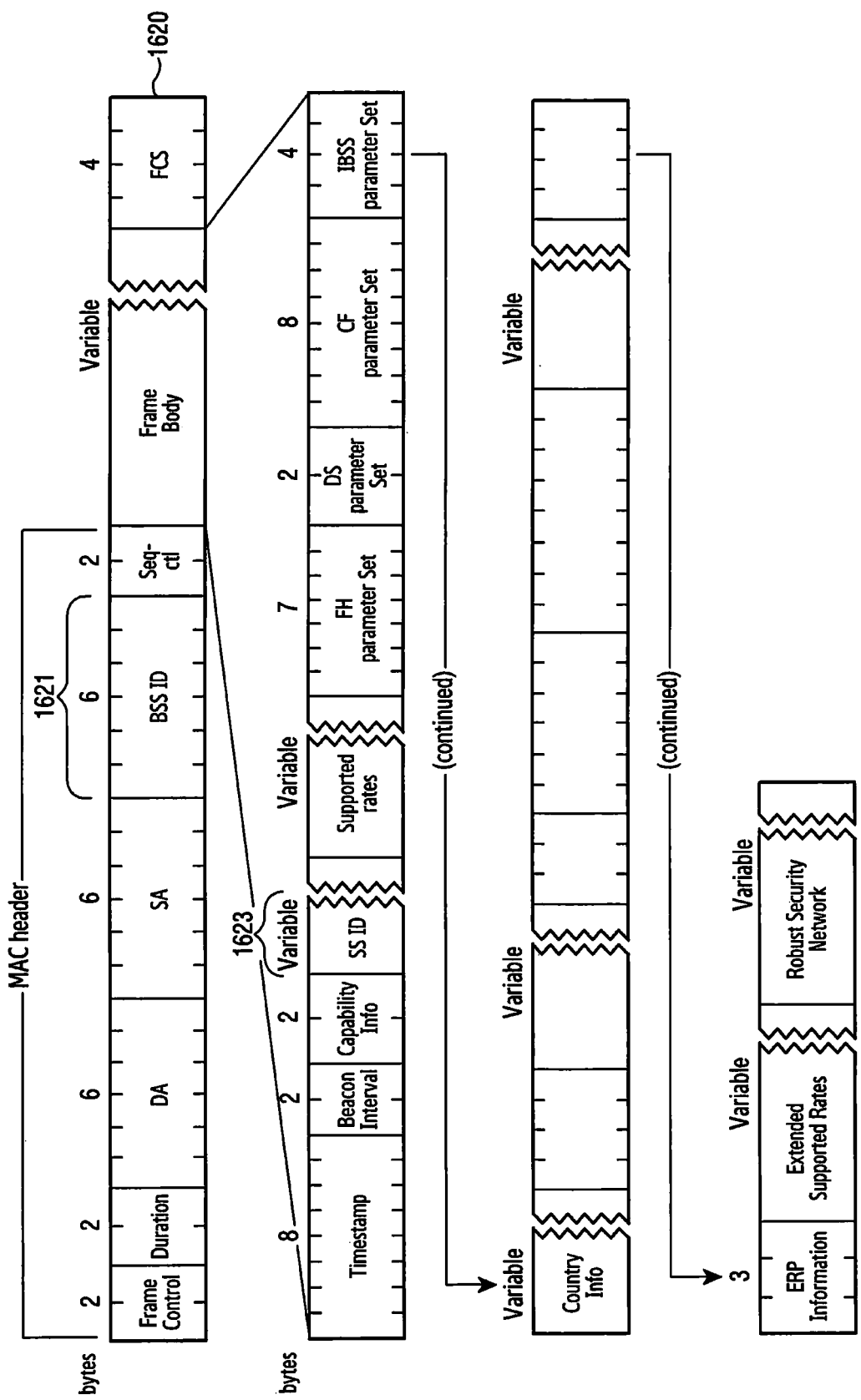
FIG. 16B illustrates an example of a probe response signal frame for transmitting host identification information according to various embodiments.

Referring to FIG. 15, in operation 1501, the processor (e.g., the processor 416) of the electronic device 101 may generate a packet including information for identifying a host device (e.g., the electronic device 108). For example, the packet may be a packet that can be used for Wi-Fi communication. In some embodiments, referring to FIG. 16A, host identification information may be included in a BSSID 1611 or service set identifier (SSID) 1613 of a beacon frame 1610. In other embodiments, referring to FIG. 16B, the host identification information may be included in the BSSID 1621 or the SSID 1623 of a probe response signal frame 1620.

In operation 1503, the processor 416 of the electronic device 101 may transmit a packet including the host identification information to a client device (e.g., the electronic device 102-1) through the communication circuit (e.g., the communication circuit 412) of the electronic device 101. In some embodiments, the packet including the host identification information may be included in the beacon frame and transmitted. In other embodiments, the packet including the host identification information may be included and transmitted in a probe response signal for responding to a probe request signal which is received by the processor 416 of the electronic device 101 from the client device through the communication circuit of the electronic device 101.

In operation 1505, the processor of the electronic device 101 may perform wireless P2P communication with the client device. In some embodiments, in the situation in which the client device identifies the host device through the host identification information included in the received packet, the processor of the electronic device 101 may perform wireless P2P communication with the client device.

As described above with reference to FIG. 15, the packet including the host identification information may be transmitted to the client device. In various embodiments, the host identification information may be transmitted via various packet formats. In connection with FIGS. 17A to 17D, embodiments of various packet formats for transmitting the host identification information to the client device are described below.

Figure 17A:
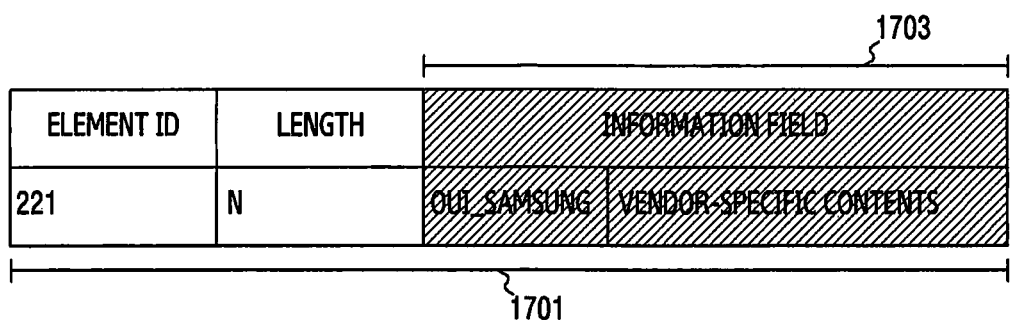
FIG. 17A illustrates an example of a vendor-specific information element (VSIE) format for transmitting host identification information to a client device according to various embodiments.

FIG. 17A illustrates an example of a vendor-specific information element (VSIE) format for transmitting host identification information to a client device according to various embodiments.

Referring to FIG. 17A, the processor (e.g., the processor 416) of the electronic device 101 may add host identification information received from a host device (e.g., the electronic device 108) to an information field 1703 of a VSIE 1701. In some embodiments, the VSIE 1701 may be information for specifying a vendor. The information field 1703 may include information on the vendor and specific content of the vendor. For example, the host identification information may include at least one of a host device name, a MAC address, user account information, or type information of the host device. According to an embodiment, the processor of the electronic device 101 may process the host identification information to generate secondary information, and may then allow the generated secondary information to be included in the information field 1703 of the VSIE 1701. For example, the secondary information may include information for identifying what type of device (e.g., a PC) is connected to the electronic device 101 is, that is, the type of the host device.

The processor 416 of the electronic device 101 may transmit the VSIE 1701 including the host identification information to a client device (e.g., the electronic device 102-1) through the communication circuit (e.g., the communication circuit 412) of the electronic device 101. The processor of the client device (e.g., the processor 428) may receive the VSIE 1701 including the host identification information through the communication circuit (e.g., the communication circuit 422) of the client device, may allow the host device retrieved through the VSIE 1701 to be displayed with an icon, and may support a quick connection between specific manufacturers' devices. Since the VSIE 1701 can be inserted into any desired packet (e.g., the beacon frame 1610 of FIG. 16A or the probe response signal frame 1620 of FIG. 16B), the VSIE 1701 may be variously utilized, as necessary, during a process of searching for the host device or a wireless P2P communication process.

Figure 17B:
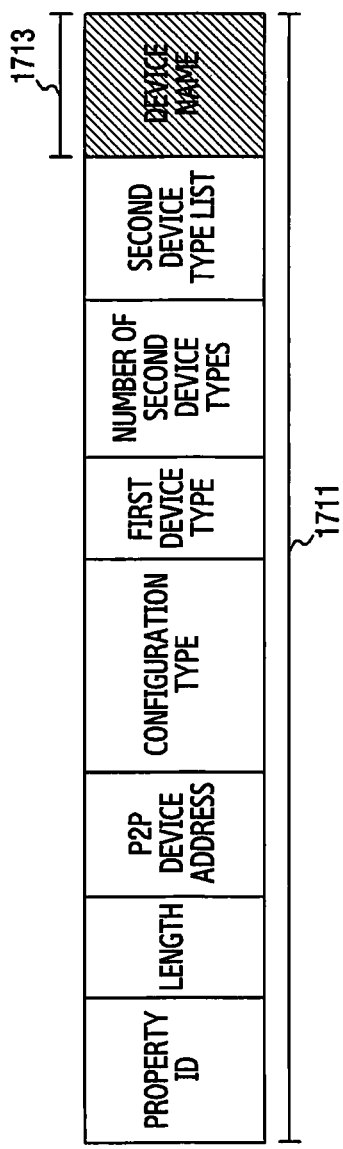
FIG. 17B illustrates an example of a device information format of a wireless P2P information element (IE) for transmitting host identification information to a client device according to various embodiments.

FIG. 17B illustrates an example of a device information format of a wireless P2P IE for transmitting host identification information to a client device according to various embodiments.

Referring to FIG. 17B, the processor of the electronic device 101 (e.g., the processor 416) may substitute a device name 1713 included in a device information format 1711 of the wireless P2P IE with the name of a host device among at least one element constituting information for identifying a host device (e.g., the electronic device 108). Through this, during wireless P2P communication, the processor (e.g., the processor 428) of the client device (e.g., the electronic device 102-1) may recognize the electronic device 101 as a host device connected to the electronic device 101.

For example, the processor of the electronic device 101 may generate a corresponding group ID using the substituted device name 1713. When the client device searches for a wireless P2P network, the electronic device 101 is actually searched for, but the name of the host device, rather than the name of the electronic device 101, may be displayed in the UX of the client device.

In some embodiments, the device information of the wireless P2P IE may be included in at least one of a frame of an association request signal, a frame of a probe request signal or a probe response signal, a frame of a GO negotiation request signal or a GO negotiation response signal, or a frame of a provisioning discovery request signal. Accordingly, the substituted device name 1713 may be used from an operation in which the client device searches for the electronic device 101 to an operation in which the client device is connected to the electronic device 101.

Figure 17C:
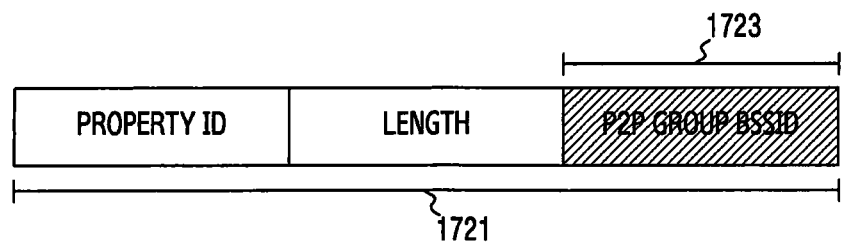
FIG. 17C illustrates an example of a basic service set identifier (BSSID) format for transmitting host identification information to a client device according to various embodiments.

FIG. 17C illustrates an example of a BSSID format for transmitting host identification information to a client device according to various embodiments.

Referring to FIG. 17C, the processor (e.g., the processor 416) of the electronic device 101 may use the MAC address of a host device received from a host device (e.g., the electronic device 108) as the device address of the electronic device 101 or a P2P group BSSID 1723 included in a BSSID format 1721.

In some embodiments, the processor of the electronic device 101 may generate a virtual MAC address and use the generated virtual MAC address as a P2P group BSSID 1723 by calculating a specific bit of the MAC address of the host device. Through this, the processor of the electronic device 101 may have different BSSIDs depending on the host device that is connected to the electronic device 101. Accordingly, the processor (e.g., the processor 428) of the client device (e.g., the electronic device 102-1) may obtain information on the host device, may use the P2P group BSSID 1723 to identify the information on the host device, and may prevent a security hole that is caused by the use of the electronic device 101 inserted into various other host devices.

The P2P group BSSID 1723 may be used as the BSSID of the frame of the beacon and the frame of the probe response signal, and the P2P group BSSID 1723 may be used when the processor of the client device searches for the electronic device 101 and connects to the electronic device 101 for wireless P2P communication. The P2P group BSSID 1723 may be included in a frame of a P2P invitation request signal or a P2P invitation response signal, and may be used for a wireless P2P connection with a client device of a persistent group.

Figure 17D:
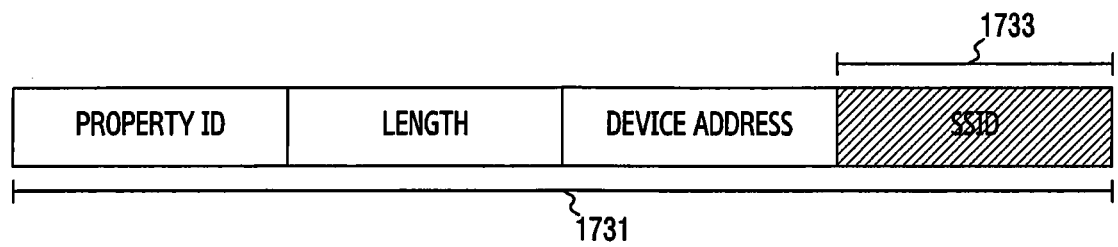
FIG. 17D illustrates an example of a service set identifier (SSID) format for transmitting host identification information to a client device according to various embodiments.

FIG. 17D illustrates an example of an SSID format for transmitting host identification information to a client device according to various embodiments.

Referring to FIG. 17D, a group ID may be included in a group management list stored in the memory (e.g., the memory 414) of the electronic device 101. When the electronic device 101 is connected to a host device (e.g., the electronic device 108) via a USB interface (e.g., a USB socket), the processor of the electronic device 101 (e.g., the processor 416) may compare the group management list with host identification information to specify a group ID, may generate a persistent group (e.g., a Wi-Fi direct group) corresponding to the group ID, and may operate as a GO.

The group ID may be used as an SSID 1733 included in an SSID format 1731 in the frame of the beacon and the frame of the probe response signal, so that the group ID may be used when the processor (e.g., the processor 428) of the client device (e.g., the electronic device 102-1) searches for the electronic device 101 and makes a wireless P2P connection. For example, if the name of the host device is PC-A, the group ID corresponding to PC-A may be determined as DIRECT-XY-PC-A. The determined group ID, that is, DIRECT-XY-PC-A, may be used as an SSID 1733 included in an SSID format 1731 in the frame of the beacon and the frame of the frame response signal, so that the determined group ID may be the name displayed on a screen when the client device searches for a P2P network. In some embodiments, the SSID format 1731 may refer to a field for indicating a network.

Figure 18:
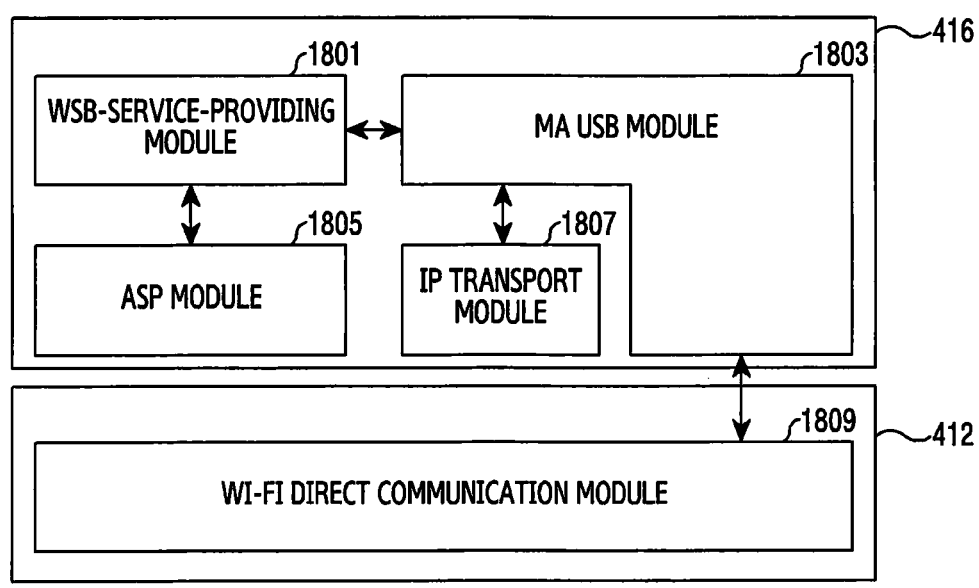
FIG. 18 illustrates interworking of a processor and a communication circuit of an electronic device supporting a Wi-Fi serial bus (WSB) according to various embodiments.

FIG. 18 illustrates interworking between a processor and a communication circuit of an electronic device supporting a Wi-Fi serial bus (WSB) according to various embodiments. FIG. 18 illustrates interworking between the processor 416 and the communication circuit 414 of the electronic device 101.

Referring to FIG. 18, the processor 416 of the electronic device 101 may include at least one of a WSB-service-providing module 1801, a media agnostic (MA) USB module 1803, an application software platform (ASP) module 1805, or an interne protocol (IP) transport module 1807. The communication circuit 412 of the electronic device 101 may include a Wi-Fi direct communication module 1809.

The WSB-service-providing module 1801 may provide service when service is otherwise unavailable due to lack of compatibility of a higher layer even though a wireless P2P connection is established between the electronic device 101 and a client device (e.g., the electronic device 102-1). In some embodiments, the WSB-service-providing module 1801 may establish a wireless P2P connection between the electronic device 101 and the client device using a Wi-Fi interface, and may provide a USB service using a USB protocol. The WSB-service-providing module 1801 may activate an MA USB module 1803 to perform a USB enumeration procedure and a USB data transmission procedure. The WSB-service-providing module 1801 may implement an MA USB protocol and may designate a function required for the operation of the MA USB through Wi-Fi. In some embodiments, the WSB service can be used without changing additional hardware or software by connecting the electronic device 101 supporting the WSB to a host device supporting only a USB interface. In particular, in the situation in which electronic devices that obviate a USB interface (e.g., a USB port) to improve a design and maximize waterproofness and dustproofness have recently emerged, the electronic device 101 supporting WSB may be usefully used for connecting a client device (e.g., a terminal) from which a USB interface is removed with a host device (e.g., a PC). That is, in the situation in which a client device lacking a USB interface supports WSB, a host device that supports the USB interface but does not support WSB may obtain the same effect as establishing a wired USB connection with the client device through the electronic device 101.

The MA USB module 1803 may establish a path through an IP to transmit USB data to the IP transport module 1807. The MA USB module 1803 may establish a path through an MAC layer for interworking with a Wi-Fi direct communication circuit.

The ASP module 1805 may interwork with the WSB-service-providing module 1801 to perform service discovery and WSB connection setup for the WSB service. The ASP module 1805 may exchange a method and event primitives for service discovery and WSB connection setup for WSB services.

The IP transport module 1807 may receive USB data from the MA USB module 1803 using a path through IP.

The Wi-Fi direct communication circuit 1809 may establish a wireless P2P connection between the electronic device 101 and the client device. In some embodiments, the wireless P2P connection may be a connection between the electronic device 101 and the client device in a data link layer, that is, an MAC layer.

Figure 20A:
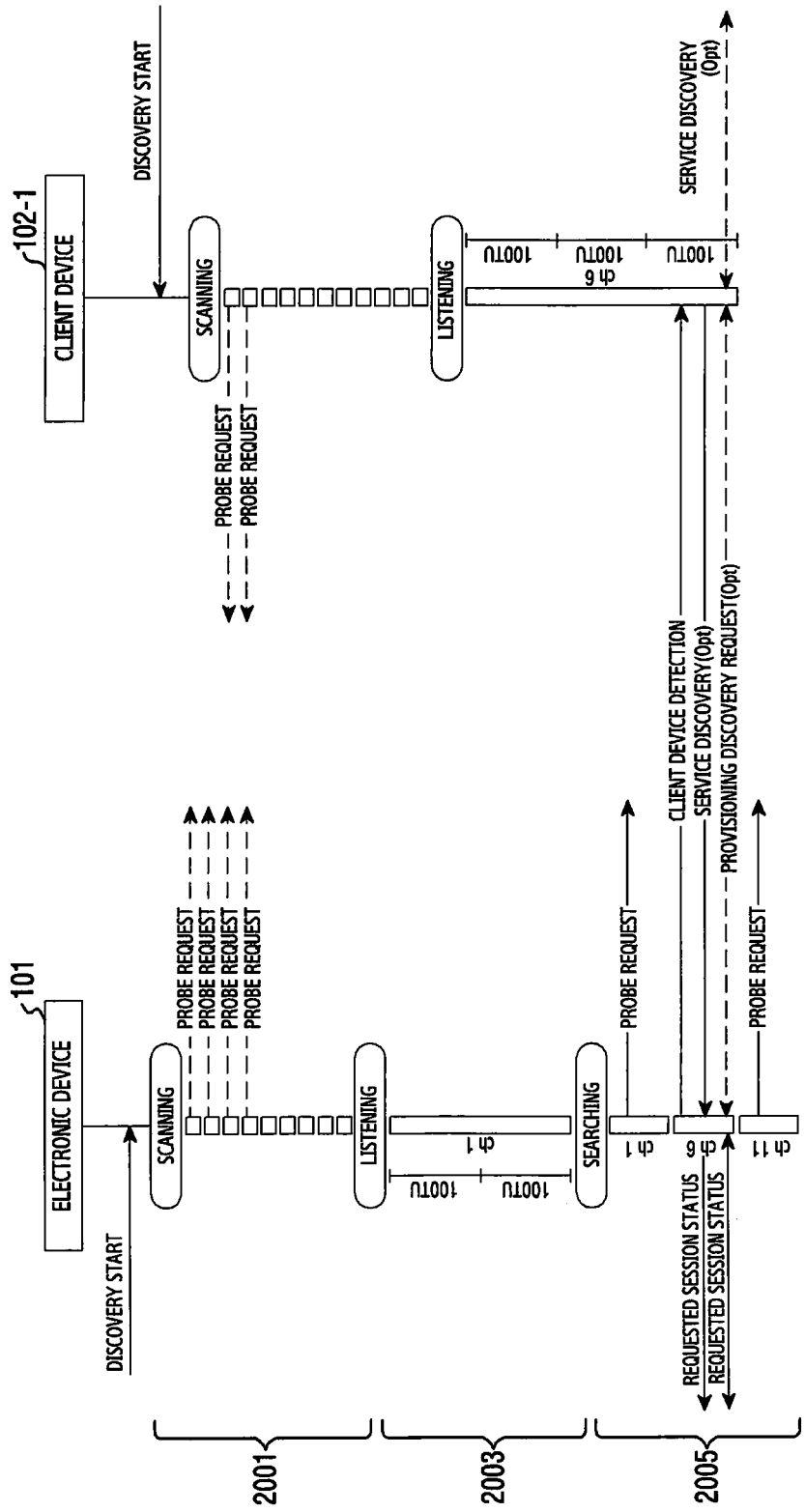
FIGS. 20A and 20B illustrate signal exchange for transmitting host identification information through setting of a WSB service according to various embodiments.
Figure 20B:
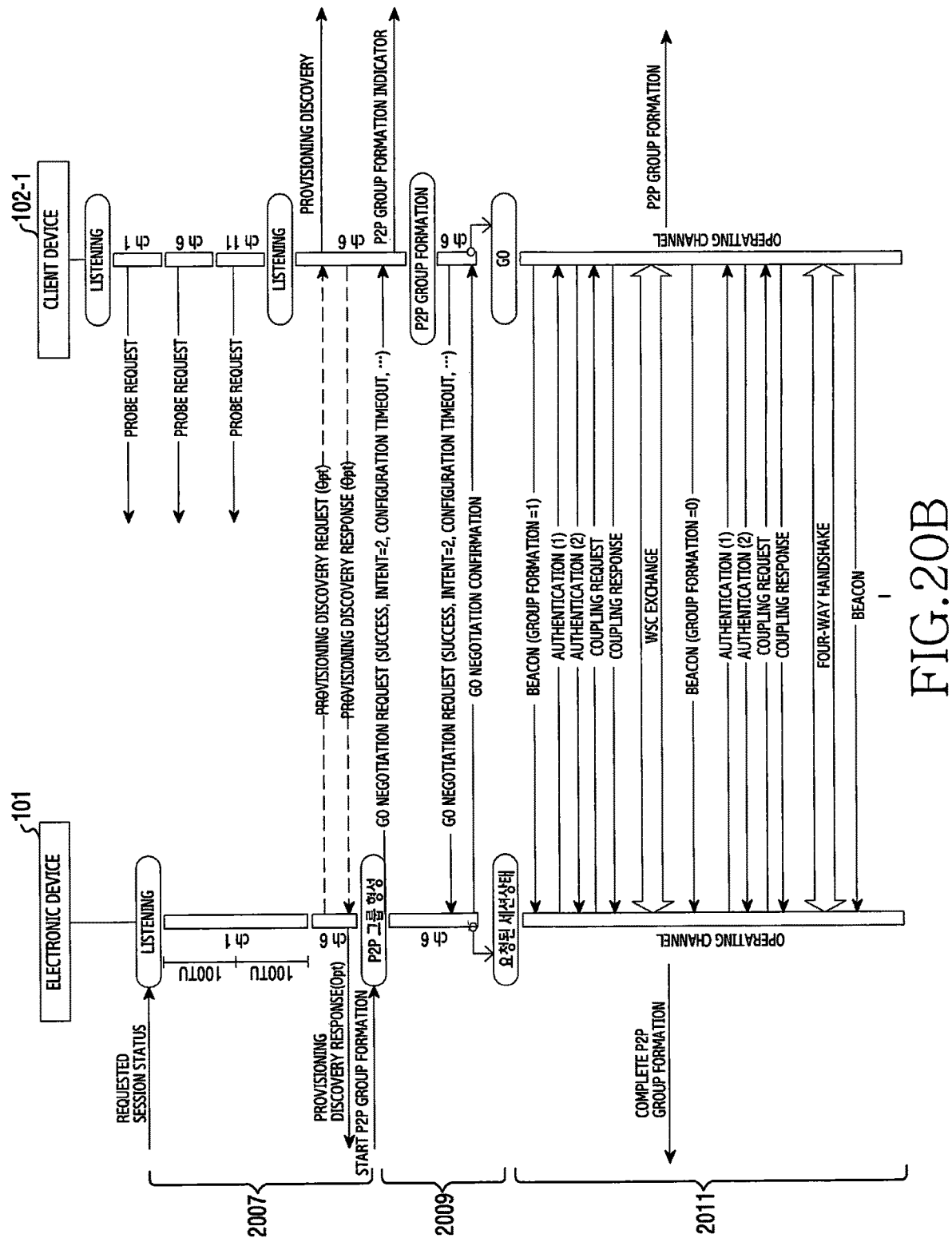

In some embodiments, the electronic device 101 may provide a WSB service through a WSB discovery procedure, a P2P connection establishment procedure, and a WSB session establishment procedure. Hereinafter, FIGS. 20A and 20B illustrate a method for transmitting host identification information to a client device through a WSB discovery procedure, a P2P connection establishment procedure, and a WSB session establishment procedure.

Figure 19A:
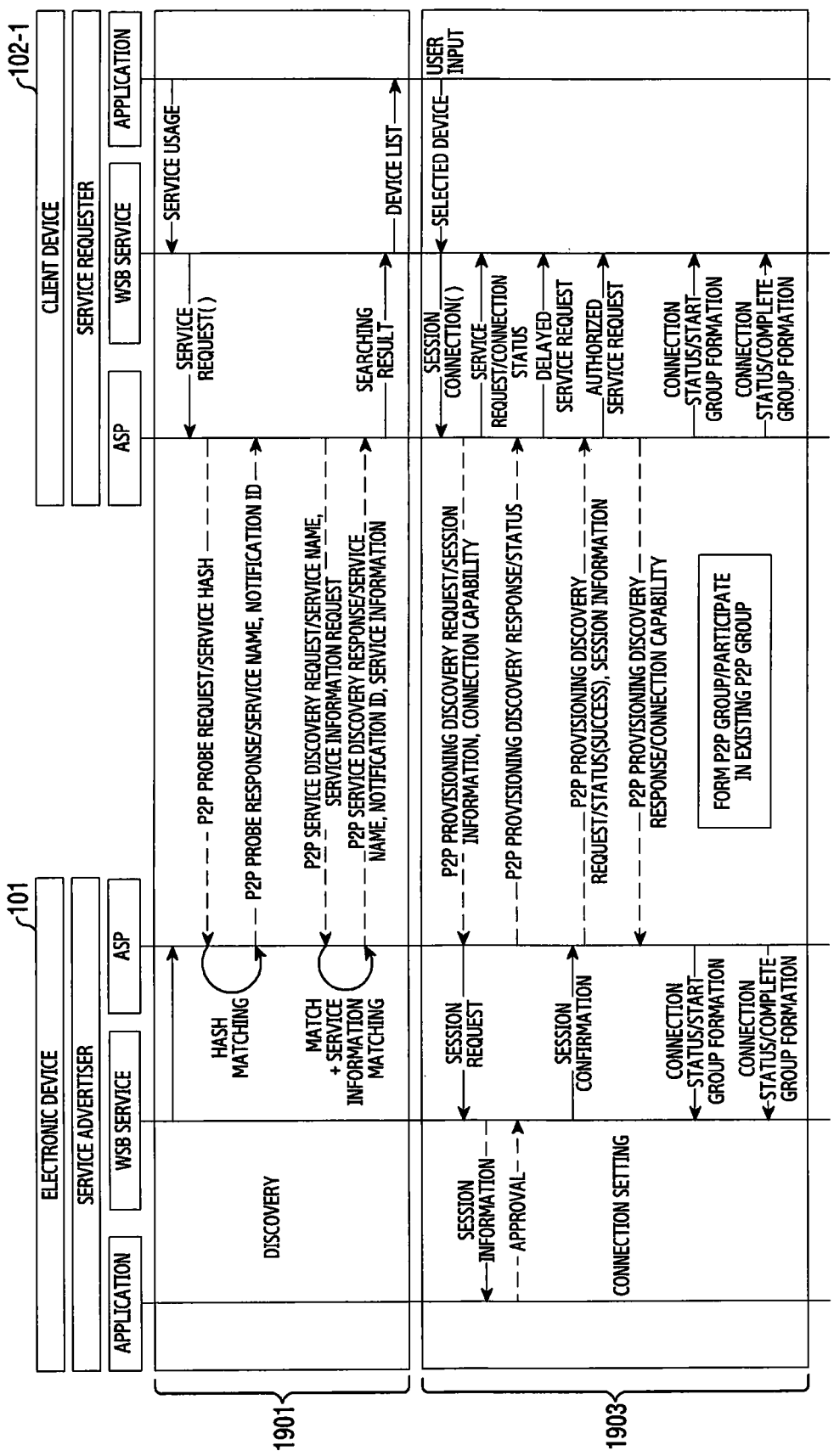
FIGS. 19A and 19B illustrate signal exchange for transmitting host identification information through setting of a WSB service according to various embodiments.
Figure 19B:
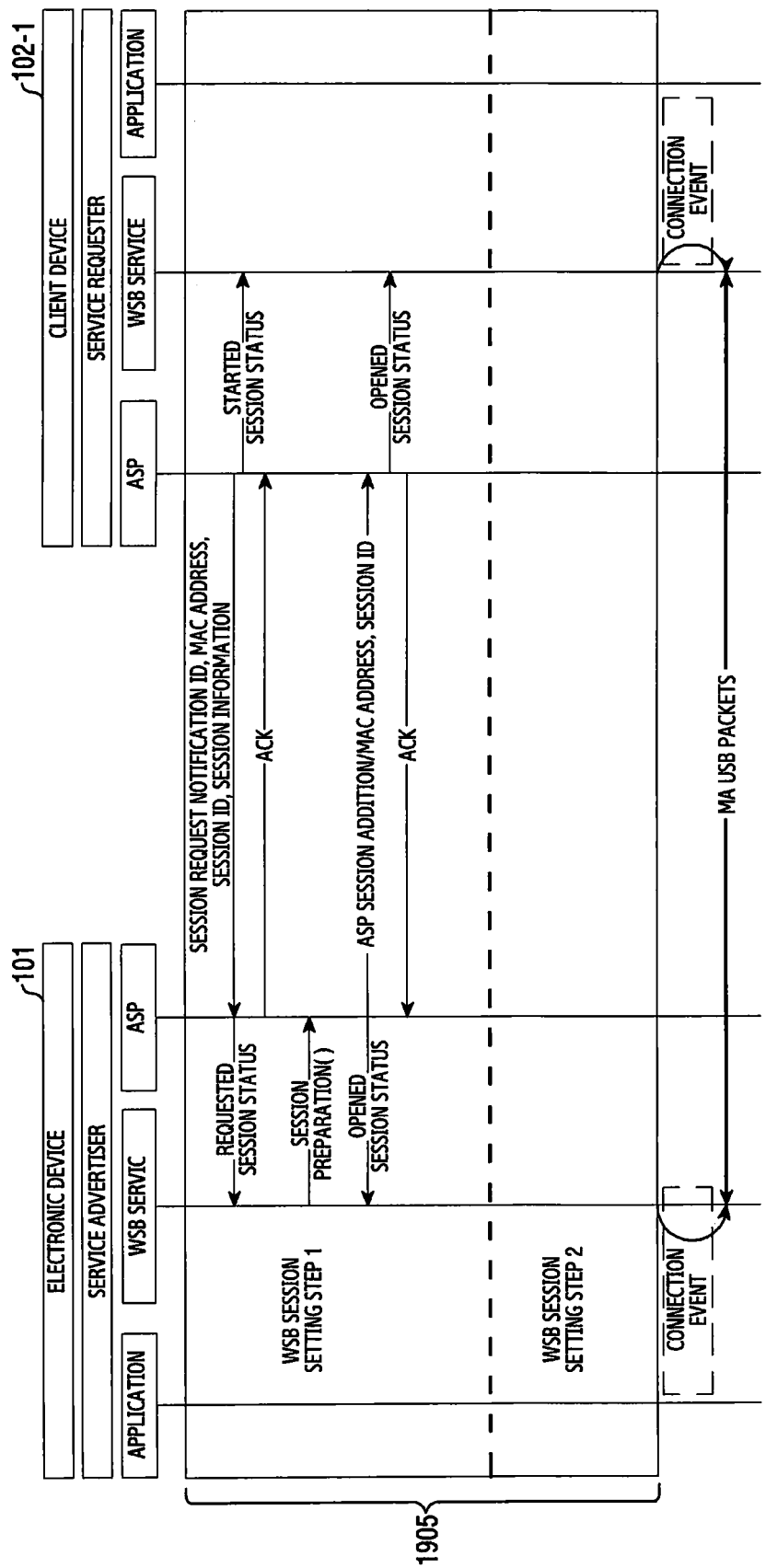

FIGS. 19A and 19B illustrate signal exchange for transmitting host identification information through the setting of a WSB service according to various embodiments. FIGS. 19A and 19B illustrate signal exchange between the electronic device 101 and a client device (e.g., the electronic device 102-1).

Referring to FIG. 19A, in a WSB discovery operation 1901, the processor (e.g., processor 416) of the electronic device 101 activates a service advertiser to provide notification of a service and retrieves a service from a client device. The processor of the electronic device 101 transmits a probe request signal containing a service hash to be retrieved for a service search through the communication circuit (e.g., the communication circuit 412) of the electronic device 101, and receives a probe response signal in response to the probe request signal. In some embodiments, the probe response signal may include information on the requested service. The information on the service included in the probe response signal includes USB functions and a transport mode of an MA USB protocol. For example, the probe response signal may include information for identifying a host device (e.g., the electronic device 108). The processor of the electronic device 101 may transmit the probe response signal including the host identification information to the client device through the communication circuit of the electronic device 101.

In a P2P connection establishment operation 1903, the processor of the electronic device 101 performs a P2P connection with a client device through a Wi-Fi P2P group. For example, the Wi-Fi P2P group may include a persistent group. In some embodiments, the Wi-Fi P2P group may be newly created or previously stored in the memory (e.g., the memory 414) of the electronic device 101 by the P2P connection establishment operation 1903.

Referring to FIG. 19B, in the WSB session establishment operation 1905, the processor of the electronic device 101 may receive an ASP session request message from the client device using an ASP adjustment protocol for the WSB service. In some embodiments, the ASP request session message may include at least one of a notification ID, a MAC address, a session ID, or session information. The processor of the electronic device 101 may transmit an ASP session addition message to the client device in response to the ASP session request message through the communication circuit of the electronic device 101. In some embodiments, the ASP session addition message may include a MAC address and a session ID.

FIGS. 20A and 20B illustrate signal exchange for transmitting host identification information through the setting of a WSB service according to various embodiments. FIGS. 20A and 20B illustrate signal exchange between the electronic device 101 and a client device (e.g., the electronic device 102-1).

Referring to FIG. 20A, in a scanning operation 2001, the processor (e.g., the processor 416) of the electronic device 101 may identify which channels currently exist for Wi-Fi direct communication. In a listening operation 2003, the processor of the electronic device 101 may select a specific channel and wait for reception of a probe request signal that can be transmitted from the client device. In a searching operation 2005, the processor of the electronic device 101 may actively search for the client device by transmitting the probe request signal.

Referring to FIG. 20B, in a provision discovery exchange operation 2007, the processor of the electronic device 101 may transmit a provisioning discovery request signal to the client device through the communication circuit (e.g., the communication circuit 412) of the electronic device 101, and may receive a provisioning discovery response signal corresponding thereto. Through this, the processor of the electronic device 101 may determine a WSC configuration method. For example, the WSC method may include a PBC or a PIN. In a P2P-group-forming operation 2009, the processor of the electronic device 101 may determine the role of a client, a GO, and a GC. In some embodiments, when the electronic device 101 operates as an autonomous GO, the P2P-group-forming operation 2009 may be omitted. For example, the autonomous GO may be a GO that operates itself as a GO without consultation with a counterpart electronic device. In a four-way handshake operation 2011, the processor of the electronic device 101 may finally perform a Wi-Fi direct connection with a client using a key obtained through a WPS process.

Figure 21:
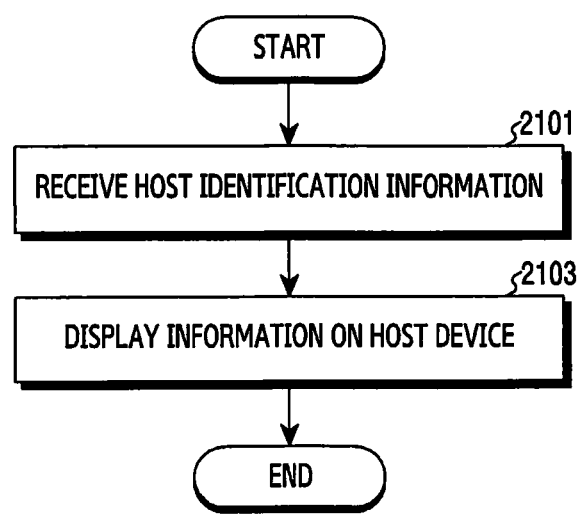
FIG. 21 illustrates a flowchart for displaying information on a host device according to various embodiments.

FIG. 21 illustrates a flowchart for displaying information on a host device according to various embodiments. FIG. 21 illustrates a method for operating a client device (e.g., the electronic device 102-1).

Referring to FIG. 21, in operation 2101, the processor (e.g., the processor 428) of the client device (e.g., the electronic device 102-1) may receive information for identifying a host device (e.g., the electronic device 108) from the electronic device 101 through the communication circuit (e.g., the communication circuit 422) of the client device (e.g., the electronic device 102-1). In some embodiments, the host identification information may include at least one of an identifier of the host device, a name of the host device, a MAC address, user account information, or type information of the host device.

In operation 2103, the processor (e.g., the processor 428) of the client device (e.g., the electronic device 102-1) may display information on the host device through the display (e.g., the display 426) of the client device. In some embodiments, the information on the host device may include host identification information received from the electronic device 101. In other embodiments, the information on the host device may include information that is newly generated by the client device using the received host identification information. In another example, when the client device searches for electronic devices for wireless P2P communication (e.g., Wi-Fi direct communication), information on the host device may be displayed on a user interface (UI). In still other embodiments, in a case in which the processor of the client device receives type information of the host device from the electronic device 101 via a VSIE through the communication circuit of the client device, when a scanning procedure for wireless P2P communication is performed, the type of host device to which the electronic device 101 is connected may be determined using type information of the host device, and accordingly, the device type of the host device may be classified and displayed using an icon or the like. In some embodiments, the processor of the client device may display information for indicating whether to perform wireless P2P communication with the host device through the display of the client device.

Although not shown in FIG. 21, according to an embodiment, the processor of the client device may identify input indicating that wireless P2P communication is performed by a user. In response to a user's input, the processor of the client device may transmit a message for requesting to join a persistent group from the electronic device 101 through the communication circuit of the client device.

Figure 22:
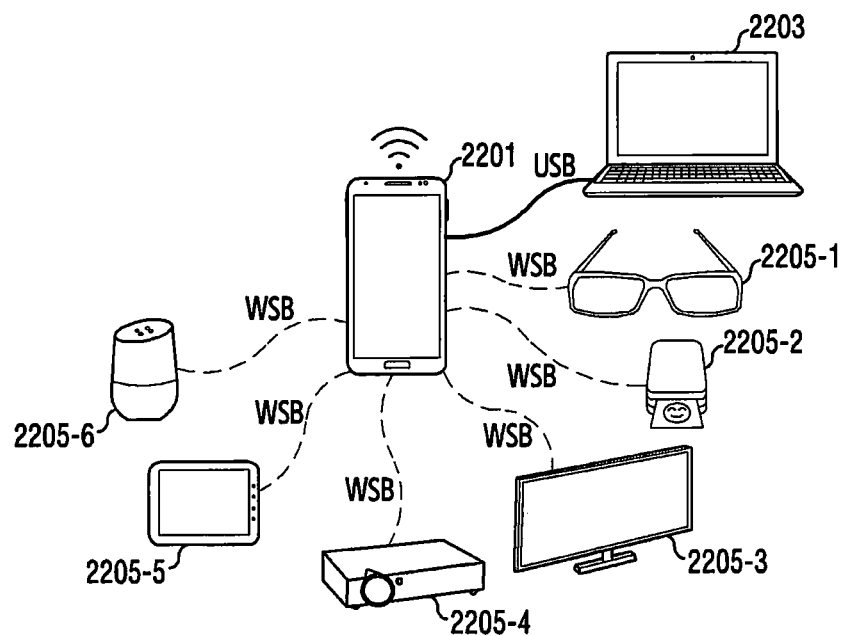
FIG. 22 illustrates an example of wireless P2P communication using an electronic device supporting both a USB connection and wireless P2P communication according to various embodiments.

FIG. 22 illustrates an example of wireless P2P communication using an electronic device supporting both a USB connection and wireless P2P communication according to various embodiments.

Referring to FIG. 22, a processor (e.g., the processor 416) of an electronic device 2201 (e.g., the electronic device 101) may support a wireless P2P communication while supporting a USB connection. For example, the electronic device 2201 may be a mobile phone. In another example, the wireless P2P communication may be Wi-Fi direct communication.

The processor (e.g., the processor 416) of the electronic device 2201 may establish a USB connection with a host device 2203 (e.g., the electronic device 108). For example, the host device 2203 may be a notebook that does not support wireless P2P communication. The processor (e.g., the processor 416) of the electronic device 2201 may perform wireless P2P communication with at least one of a client device 2205-1 (e.g., the electronic device 102-1), a client device 2205-2, a client device 2205-3, a client device 2205-4, a client device 2205-5, or a client device 2205-6. For example, the client device 2205-1 may be smart glasses, the client device 2205-2 may be a printer, the client device 2205-3 may be a monitor, the client device 2205-4 may be a projector, the client device 2205-5 may be a tablet, and the client device 2205-6 may be a set top box.

The processor of the electronic device 2201 may be connected to the host device 2203 via USB to perform wireless P2P communication with at least one of the client devices 2205-1, 2205-2, 2205-3, 2205-4, 2205-5, and 2205-6, whereby the host device 2203, which does not support wireless P2P communication, and the client devices may perform wireless P2P communication.

Figure 23A:
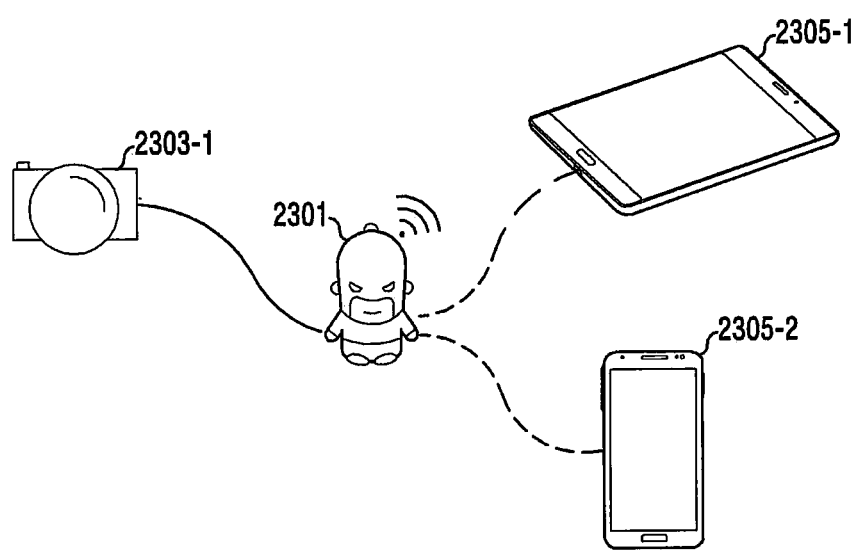
FIGS. 23A and 23B illustrate an example of wireless P2P communication according to various embodiments.
Figure 23B:
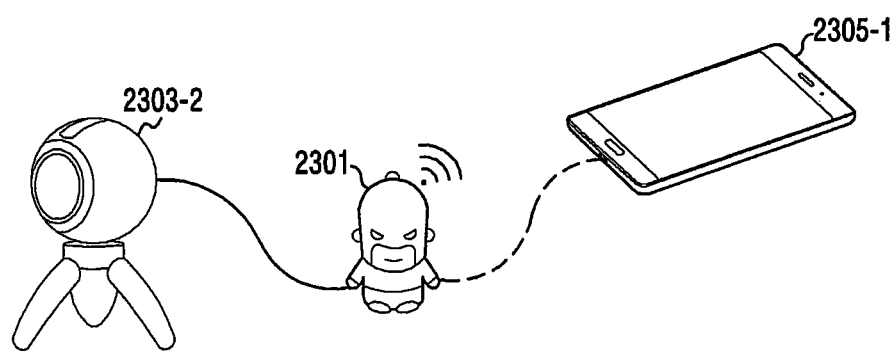

FIGS. 23A and 23B illustrate examples of wireless P2P communication according to various embodiments.

Referring to FIGS. 23A and 23B, although the host device (e.g., the electronic device 108) provides only a USB cable interface and does not support wireless P2P communication, when the host device is connected to an electronic device 2301 (e.g., the electronic device 101) that supports wireless P2P communication through the USB cable interface, the host device may transmit and receive data (e.g., pictures or videos) through wireless P2P communication with the client devices 2305-1 and 2305-2 (e.g., the electronic device 102-1). For example, the host device may be a digital camera 2303-1 or a camera 2303-2 capable of capturing a 3D image. In another example, the host device may be a camera capable of 360-degree imaging and three-dimensional (3D) imaging. In this case, the client devices 2305-1 and 2305-2 may identify, delete, edit, or share data received from the host device in units of folders, such as when connected to the host device through a USB cable interface. Through this, a user may rapidly and simply transmit and receive data to and from the client devices 2305-1 and 2305-2 without fear of losing a USB cable or a secure digital (SD) card for storing data of the host device. In addition, the client devices 2305-1 and 2305-2 may directly access data without moving the data to the client devices 2305-1 and 2305-2 in order to share the data with a social network service (SNS) or perform an advanced editing procedure. In some embodiments, the electronic device 2301 may include an auxiliary battery function, thereby supplementing the power required to configure a wireless P2P communication (e.g., WSB) interface.

Figure 24A:
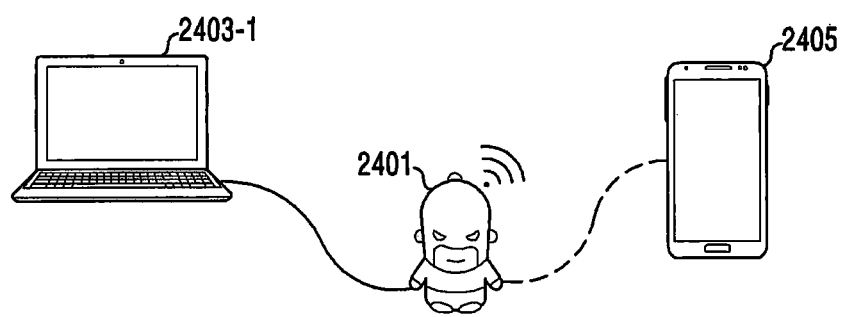
FIGS. 24A and 24B illustrate an example of wireless P2P communication between electronic devices using different operating systems according to various embodiments.

FIGS. 24A and 25B illustrate an example of wireless P2P communication between electronic devices using different operating systems according to various embodiments.

Figure 24B:
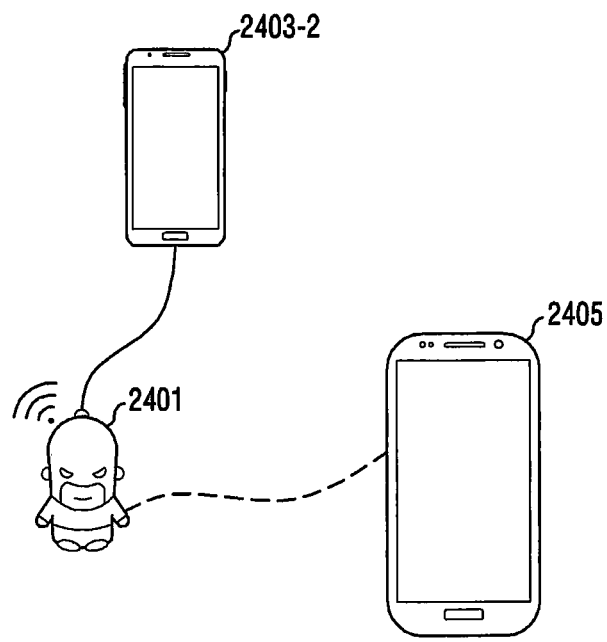

Referring to FIGS. 24A and 24B, even if a host device (e.g., the electronic device 108) and a client device 2405 (e.g., the electronic device 102-1) use different operating systems, when the host device is connected to an electronic device 2401 (e.g., the electronic device 101) that supports wireless P2P communication through a USB cable interface, the host device may transmit and receive data through wireless P2P communication with the client device 2405. For example, the host device may be a laptop 2403-1 or a smartphone 2403-2. In some embodiments, the host device may transmit and receive data to and from the client device 2405 via a WSB protocol. Through this, the host device and the client device 2405 may smoothly transmit and receive data without installing a driver or an application for compatibility of different operating systems or connecting a cable.

Figure 25:
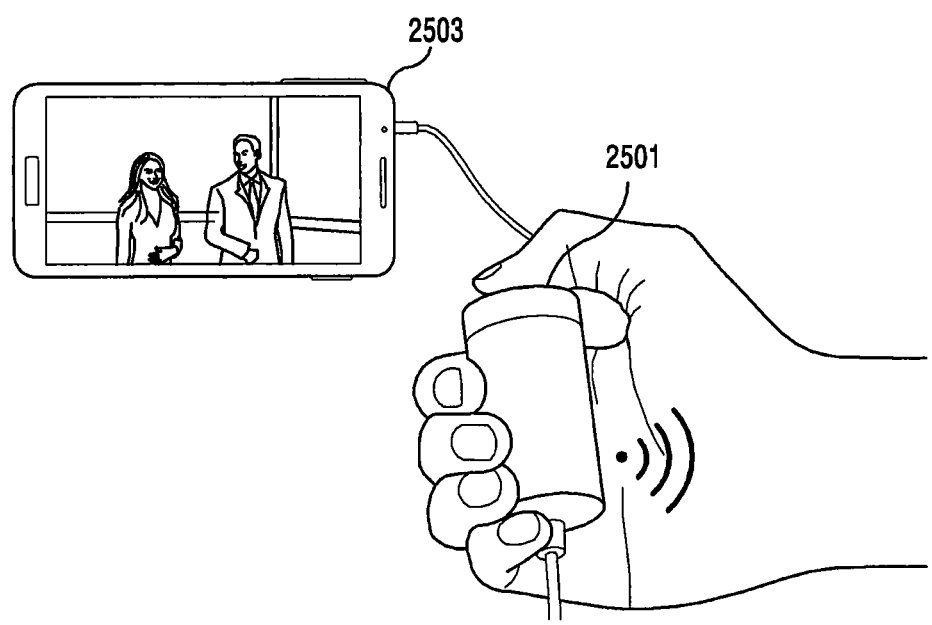
FIG. 25 illustrates an example of the function of an electronic device supporting both wired communication and wireless P2P communication according to various embodiments.

FIG. 25 illustrates an example of a function of an electronic device supporting both wired communication and wireless P2P communication according to various embodiments.

Referring to FIG. 25, at least one of an auxiliary battery, an LED, a speaker, a display, an illumination sensor, an acceleration sensor, or a wireless communication (e.g., Bluetooth, BLE, ZigBee, Z-Wave, etc.) function may be combined with an electronic device 2501 (e.g., the electronic device 101) together with a wireless P2P communication function. In some embodiments, when the auxiliary battery function is added to the electronic device 2501, the electronic device 2501 may supply power to a host device 2503 (e.g., the electronic device 108) that is easily discharged. For example, the host device 2503 may be a mobile device. In another example, in the case in which a camera is used as the host device 2503 at a travel destination, when a picture is sent from the host device 2503 to a client device (e.g., the electronic device 102-1) immediately after the user takes a picture, the host device 2503 may consume a lot of power. Here, if the auxiliary battery function is added to the electronic device 2501, the taken picture may be immediately transmitted to a desired client device without a separate backup process while solving this problem.

In other embodiments, when the speaker function is added to the electronic device 101, the electronic device 101 may output a reproduced sound source. In still other embodiments, when an LED or a simple display is coupled to the electronic device 101, the electronic device 101 may intuitively display at least one of a current transmission status, a battery status, or a remaining disk capacity status to a user. In still other embodiments, when a Bluetooth function is added to the electronic device 101, a user may take a picture using a remote switch or an operation button of the electronic device 101 when taking a selfie or a group picture.

A method for operating an electronic device (e.g., the electronic device 101) according to various embodiments may include: determining that a USB connector (e.g., the USB 274) included in the electronic device is electrically connected to a first external electronic device (e.g., the electronic device 108) having an identifier; receiving the identifier from the first external electronic device through the USB connector; receiving a probe request from a second external electronic device (e.g., the electronic device 102-1) through a wireless communication circuit (e.g., the communication circuit 412) included in the electronic device; transmitting a wireless signal packet to the second external electronic device through the wireless communication circuit; and establishing a wireless communication channel with the second external electronic device.

The wireless communication circuit (e.g., the communication circuit 412) according to various embodiments may support a Wi-Fi direct protocol. The method for operating the electronic device according to various embodiments may further include determining whether the identifier exists in a list of identifiers stored in a memory (e.g., the electronic device 414) included in the electronic device before generating the wireless signal packet. The method for operating the electronic device according to various embodiments may further include determining a group for wireless communication with the second external electronic device (e.g., the electronic device 102-1) based on the identifier. The group according to various embodiments may include a persistent group for performing wireless communication with the first external electronic device (e.g., the electronic device 108) without performing a discovery procedure, an owner determination procedure, or an authentication procedure.

The wireless signal packet according to various embodiments may include a device name field including the identifier. The wireless signal packet according to various embodiments may include an information field including the identifier. The identifier according to various embodiments may include the MAC address of the first external electronic device.

A system according to various embodiments may include an electronic device (e.g., the electronic device 101) configured to receive, from a first external electronic device (e.g., the electronic device 108) having an identifier, the identifier through a USB connector (e.g., the USB 274); and a second external electronic device (e.g., the electronic device 102-1) configured to transmit a probe request to the electronic device. The electronic device may transmit a wireless signal packet including the identifier to the second external electronic device. The second external electronic device may establish a wireless communication channel with the electronic device.

The second external electronic device (e.g., the electronic device 102-1) according to various embodiments may display information on the first external electronic device (e.g., the electronic device 108) based on the identifier. According to various embodiments, the electronic device may determine whether the USB connector (e.g., the USB 274) included in the electronic device is electrically connected to the first external electronic device. The electronic device according to various embodiments may generate the wireless signal packet including the identifier.

The embodiments of the disclosure disclosed in the specification and the drawings are only particular examples proposed in order to easily describe the technical matters of the disclosure and help with comprehension of the disclosure, and do not limit the scope of the disclosure. Therefore, in addition to the embodiments disclosed herein, the scope of the various embodiments of the disclosure should be construed to include all modifications or modified forms drawn based on the technical idea of the various embodiments of the disclosure.

The invention claimed is:

1. An electronic device comprising:
a housing;
a universal serial bus (USB) connector configured to be connected to or integrated with the housing;
a wireless communication circuit configured to be located in the housing;
a memory; and
a processor configured to be located in the housing and electrically coupled to the USB connector, the memory and the wireless communication circuit,
wherein the memory stores, when executed, instructions that cause the processor to:
determine whether the USB connector is electrically connected to a first external electronic device having an identifier,
receive the identifier from the first external electronic device through the USB connector,
determine whether a first group corresponding to the identifier is included in a group management list stored in the memory, wherein the first group includes at least one external electronic device for performing wireless communication with the first external electronic device without performing a discovery procedure, an owner determination procedure, or an authentication procedure,
when the first group is included in the group management list, determine the first group as a group for performing the wireless communication, wherein the electronic device operates as a group owner of the first group, and
when the first group is not included in the group management list, generate a second group corresponding to the identifier and store the second group in the group management list, wherein the electronic device operates as a group owner of the second group,
wherein the instructions further cause the processor to:
generate a wireless signal packet including the identifier of the first external electronic device,
receive a probe request from a second external electronic device through the wireless communication circuit,
transmit the wireless signal packet including the identifier of the first external electronic device to the second external electronic device through the wireless communication circuit, and
establish a wireless communication channel with the second external electronic device after transmitting the wireless signal packet.

2. The electronic device as claimed in claim 1, wherein the wireless signal packet includes a device name field including the identifier.

3. The electronic device as claimed in claim 1, wherein the wireless signal packet includes an information field including the identifier.

4. The electronic device as claimed in claim 1, wherein the identifier includes a medium access control (MAC) address of the first external electronic device.

5. A method for operating an electronic device, comprising:
determining whether a USB connector included in the electronic device is electrically connected to a first external electronic device having an identifier;
receiving the identifier from the first external electronic device through the USB connector;
determining whether a first group corresponding to the identifier is included in a group management list stored in a memory included in the electronic device, wherein the first group includes at least one external electronic device for performing wireless communication with the first external electronic device without performing a discovery procedure, an owner determination procedure, or an authentication procedure;
when the first group is included in the group management list, determining the first group as a group for performing the wireless communication, wherein the electronic device operates as a group owner of the first group; and
when the first group is not included in the group management list, generating a second group corresponding to the identifier and store the second group in the group management list, wherein the electronic device operates as a group owner of the second group,
wherein the method further comprises:
generating a wireless signal packet including the identifier of the first external electronic device,
receiving a probe request from a second external electronic device through a wireless communication circuit included in the electronic device;
transmitting the wireless signal packet including the identifier of the first external electronic device to the second external electronic device through the wireless communication circuit; and
establishing a wireless communication channel with the second external electronic device after transmitting the wireless signal packet.

6. The method for operating the electronic device as claimed in claim 5, wherein the wireless signal packet includes a device name field including the identifier.

7. The method for operating the electronic device as claimed in claim 5, wherein the wireless signal packet includes an information field including the identifier.

8. The method for operating the electronic device as claimed in claim 5, wherein the identifier includes a MAC address of the first external electronic device.

9. A system comprising:
an electronic device configured to:
 receive, from a first external electronic device having an identifier, the identifier through a USB connector;
 determine whether a first group corresponding to the identifier is included in a group management list stored in a memory, wherein the first group includes at least one external electronic device for performing wireless communication with the first external electronic device without performing a discovery procedure, an owner determination procedure, or an authentication procedure;
 when the first group is included in the group management list, determine the first group as a group for performing the wireless communication, wherein the electronic device operates as a group owner of the first group; and
 when the first group is not included in the group management list, generate a second group corresponding to the identifier and store the second group in the group management list, wherein the electronic device operates as a group owner of the second group, and
a second external electronic device configured to transmit a probe request to the electronic device, wherein
in response to the probe request, the electronic device transmits a wireless signal packet including the identifier of the first external electronic device to the second external electronic device, and the second external electronic device establishes a wireless communication channel with the electronic device based on the identifier of the first external electronic device.

* * * * *